(12) United States Patent
Jagetiya

(10) Patent No.: US 8,290,476 B2
(45) Date of Patent: Oct. 16, 2012

(54) METHOD AND APPARATUS FOR SCHEDULING THE TRANSMISSION OF MESSAGES FROM A MOBILE DEVICE

(75) Inventor: Vikas Jagetiya, Rajasthan (IN)

(73) Assignee: QUALCOMM Incorporated, San Diego, CA (US)

( * ) Notice: Subject to any disclaimer, the term of this patent is extended or adjusted under 35 U.S.C. 154(b) by 1065 days.

(21) Appl. No.: 12/139,794

(22) Filed: Jun. 16, 2008

(65) Prior Publication Data

US 2009/0311992 A1  Dec. 17, 2009

(51) Int. Cl.
*H04M 1/725* (2006.01)
*H04W 4/00* (2009.01)

(52) U.S. Cl. ................. 455/412.1; 455/566

(58) Field of Classification Search ........... 455/412.1, 455/466
See application file for complete search history.

(56) References Cited

U.S. PATENT DOCUMENTS

| | | | |
|---|---|---|---|
| 7,466,987 B2 * | 12/2008 | Kinnunen et al. | 455/456.3 |
| 7,471,946 B2 | 12/2008 | Adamczyk et al. | |
| 7,917,153 B2 * | 3/2011 | Orwant et al. | 455/456.1 |
| 2001/0039191 A1 * | 11/2001 | Maierhofer | 455/466 |
| 2002/0087649 A1 * | 7/2002 | Horvitz | 709/207 |
| 2003/0078033 A1 * | 4/2003 | Sauer et al. | 455/412 |
| 2003/0157945 A1 * | 8/2003 | Chen et al. | 455/458 |
| 2004/0063447 A1 * | 4/2004 | Yokouchi | 455/466 |
| 2004/0266398 A1 * | 12/2004 | Adamczyk et al. | 455/412.1 |
| 2005/0013291 A1 | 1/2005 | Yamamoto et al. | |
| 2005/0208927 A1 * | 9/2005 | Wong et al. | 455/412.1 |
| 2005/0227711 A1 * | 10/2005 | Orwant et al. | 455/456.3 |
| 2006/0223494 A1 * | 10/2006 | Chmaytelli et al. | 455/404.2 |
| 2007/0232274 A1 * | 10/2007 | Jung et al. | 455/412.1 |
| 2007/0270159 A1 * | 11/2007 | Lohtia et al. | 455/456.1 |
| 2008/0020786 A1 * | 1/2008 | Smith et al. | 455/466 |
| 2008/0299999 A1 * | 12/2008 | Lockhart et al. | 455/466 |
| 2009/0098859 A1 * | 4/2009 | Kamdar et al. | 455/412.1 |
| 2009/0104893 A1 * | 4/2009 | Adamczyk et al. | 455/412.1 |

FOREIGN PATENT DOCUMENTS

| | | |
|---|---|---|
| EP | 1361727 A2 | 11/2003 |
| JP | 2002330174 A | 11/2002 |
| JP | 2005039507 A | 2/2005 |
| JP | 2005209029 A | 8/2005 |
| JP | 2006101292 A | 4/2006 |
| JP | 2009545255 A | 12/2009 |
| WO | WO2008014292 | 1/2008 |

OTHER PUBLICATIONS

International Search Report & Written Opinion—PCT/US2009/046675, International Search Authority—European Patent Office—Aug. 27, 2009.

* cited by examiner

*Primary Examiner* — Nathan Mitchell
(74) *Attorney, Agent, or Firm* — James T. Hagler

(57) ABSTRACT

Methods and devices enable scheduling the transmission of messages based upon date, time and/or location transmission criteria. Text and multimedia messages may be drafted and scheduled for automatic transmission at a later time and date or when the mobile device is in a particular location. Alternatively, methods and systems enable the message to be sent automatically from a remote server.

27 Claims, 19 Drawing Sheets

| Recipient(s) | Message pointer | Date | Time | Recurring Event |
|---|---|---|---|---|
| Jerry, Bob, Phil | addr1 | January 1 | 00:01:00 PST | Yes |
| Mickey, Bill | addr2 | February 2 | 08:00:00 EST | Yes |
| Donna Jean | addr3 | February 14 | 09:00:00 CST | Yes |
| 212-555-1212 | addr4 | March 2, 2009 | 08:30:00 GST | No |
| 202-555-1313 | addr5 | March 30, 2009 | 12:30:00 EST | No |
| Steve, Melissa | addr6 | May 5 | 12:00:00 EST | Yes |
| 310-555-1414 | addr7 | May 15, 2009 | 10:00:00 PST | No |
| Jesse, Shawn | addr8 | July 4, 2009 | 11:15:00 CST | No |
| Karen | addr9 | August 15, 2009 | 08:20:00 EST | No |

FIG. 6A

| | Recipient(s) | Message text | Date | Time | Recurring Event |
|---|---|---|---|---|---|
| | 12 | 14b | 16 | 18 | 20 |
| 11 | Jerry, Bob, Phil | Message text | January 1 | 00:01:00 PST | Yes |
| 13 | Mickey, Bill | Message text | February 2 | 08:00:00 EST | Yes |
| 15 | Donna Jean | Message text | February 14 | 09:00:00 CST | Yes |
| 17 | 212-555-1212 | Message text | March 2, 2009 | 08:30:00 GST | No |
| 19 | 202-555-1313 | Message text | March 30, 2009 | 12:30:00 EST | No |
| 21 | Steve, Melissa | Message text | May 5 | 12:00:00 EST | Yes |
| 23 | 310-555-1414 | Message text | May 15, 2009 | 10:00:00 PST | No |
| 25 | Jesse, Shawn | Message text | July 4, 2009 | 11:15:00 CST | No |
| 27 | Karen | Message text | August 15, 2009 | 08:20:00 EST | No |

FIG. 6B

| Recipient(s) | Message pointer | Date | Time | Recurring Event | GPS/CellID |
|---|---|---|---|---|---|
| Jerry, Bob, Phil | Addr1 | January 1 | 00:01:00 PST | Yes | |
| Mickey, Bill | addr2 | February 2 | 08:00:00 EST | Yes | |
| Donna Jean | addr3 | February 14 | 09:00:00 CST | Yes | |
| 212-555-1212 | addr4 | March 2, 2009 | 08:30:00 GST | No | |
| 202-555-1313 | addr5 | March 30, 2009 | 12:30:00 EST | No | |
| Steve, Melissa | addr6 | May 5 | 12:00:00 EST | Yes | |
| 310-555-1414 | addr7 | May 15, 2009 | 10:00:00 PST | No | |
| Jesse, Shawn | addr8 | July 4, 2009 | 11:15:00 CST | No | |
| Karen | addr9 | August 15, 2009 | 08:20:00 EST | No | |
| Bob | addr10 | | | Yes | Washington DC |
| Charles | addr11 | | | Yes | London |
| Dave | addr12 | | | Yes | Los Angeles |
| Karen | addr13 | | | Yes | Chicago |

FIG. 13A

| Recipient(s) | Message | Date | Time | Recurring Event | GPS/CellID |
|---|---|---|---|---|---|
| Jerry, Bob, Phil | Addr1 | January 1 | 00:01:00 PST | Yes | |
| Mickey, Bill | addr2 | February 2 | 08:00:00 EST | Yes | |
| Donna Jean | addr3 | February 14 | 09:00:00 CST | Yes | |
| 212-555-1212 | addr4 | March 2, 2009 | 08:30:00 GST | No | |
| 202-555-1313 | addr5 | March 30, 2009 | 12:30:00 EST | No | |
| Steve, Melissa | addr6 | May 5 | 12:00:00 EST | Yes | |
| 310-555-1414 | addr7 | May 15, 2009 | 10:00:00 PST | No | |
| Jesse, Shawn | addr8 | July 4, 2009 | 11:15:00 CST | No | |
| Karen | addr9 | August 15, 2009 | 08:20:00 EST | No | |
| Bob | addr10 | | | Yes | Washington DC |
| Charles | addr11 | | | Yes | London |
| Dave | addr12 | | | Yes | Los Angeles |
| Karen | addr13 | | | Yes | Chicago |

FIG. 13B

METHOD AND APPARATUS FOR SCHEDULING THE TRANSMISSION OF MESSAGES FROM A MOBILE DEVICE

FIELD OF THE INVENTION

The present invention relates to messaging from mobile devices, and more particularly to scheduling the transmission of messages generated on a mobile device.

BACKGROUND

Use of wireless mobile communication handsets (mobile devices), such as cellular telephones, is ever increasing due to their portability and connectivity, as well as the multitude of applications that execute on them. One of the most often used applications on mobile devices is text messaging. Today text messaging is the most widely used mobile data service on the planet, with 72% of all mobile device users worldwide—1.9 Billion out of 2.7 Billion phone subscribers at end of 2006—being active users of the Short Message Service (SMS). In countries like Finland, Sweden and Norway over 90% of the population use SMS. The European average is about 85% and North America is rapidly catching up with over 40% active users of SMS by the end of 2006.

Text messaging has become so popular that advertising agencies and advertisers are now jumping into the text message business. Services that provide bulk text message sending are also becoming a popular way for clubs, associations, and advertisers to quickly reach a group of opt-in subscribers.

Text messaging offers some benefits over voice communication. User may communicate via text messaging when one or both communicants are hearing impaired or in locations where ambient noise impair voice communications. Since text message data signals do not require as much signal power as voice data signals, users may communicate via text messaging in situations where signal strength is not optimal. Some recipients of text messages find text messages to be a more personal form of communication compared to voice communication. Thus, recipients often find that receiving a text message on important occasions such as birthdays, anniversaries, etc. particularly endearing. In addition to text messages, alternative messaging services have been developed which augment text messaging to allow a user to also include other media files with the message. For example, a user may send a message comprising a video, animation, or audio in addition to text.

SUMMARY

Various embodiments provide methods and mobile devices which allow a user to schedule the delivery of messages to recipients so that important occasions are not forgotten. Users can schedule a specific date and time at which a previously drafted message will be transmitted. Alternative embodiments provide methods and mobile devices which allow a user to alert an intended recipient(s) when the user has traveled to a particular location (e.g., the vicinity of the intended recipient). A criteria table may be used to determine when a previously drafted message should be transmitted to an intended recipient(s). The criteria table may include data to enable the mobile device to send a previously drafted message at a certain date and time, when the user arrives in a particular location or in some combination or date, time, and location.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 6A and 6B are diagrams of transmission parameter table data structures suitable for use with various embodiments.

FIGS. 13A and 13B are diagrams of transmission parameter table data structures suitable for use with various embodiments.

DETAILED DESCRIPTION

Figure 1:
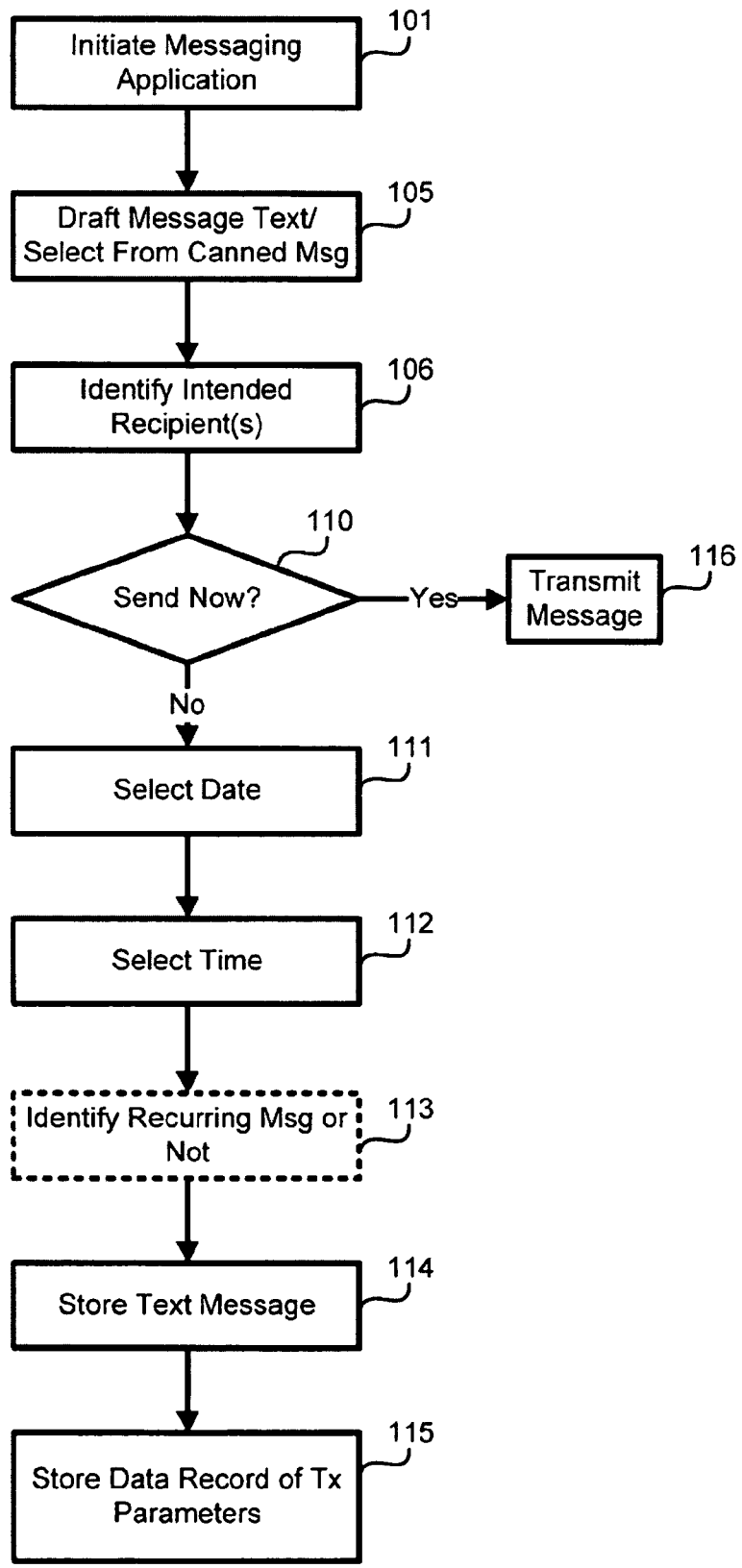
FIG. 1 is a process flow diagram of an embodiment method for scheduling the transmission of a text message on a mobile device.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term mobile device may refer to any one or all of cellular telephones, personal data assistants (PDA's), wireless electronic mail receivers (e.g., the Blackberry® and Treo® devices), multimedia Internet enabled cellular telephones (e.g., the iPhone®), and similar personal electronic devices which include a programmable processor, memory and access to a messaging service such as SMS, Multimedia Messaging Service (MMS), Enhanced Messaging Service (EMS), etc. For sake of simplicity, the various embodiments are described using the text messaging capabilities of SMS as an example. The various embodiments apply equally to other messaging services, such as MMS and EMS. SMS, MMS, and EMS provide users with the ability to prepare and send text messages to intended recipients. However, MMS and EMS allow users to include additional media forms such as animations, video, audio, etc. within the message content. Once the message content is prepared, both MMS and EMS messages may be scheduled for transmission in accordance with the various embodiments. While references are made herein to text messages, one of skill in the art would appreciate that a text message may be augmented in an MMS or EMS service by attaching additional media files without affecting the various embodiments.

In a preferred embodiment, the mobile device is a cellular handset that can communicate via a cellular telephone network (e.g., a cellphone). However, cellular telephone communication capability is not necessary in all embodiments. Moreover, wireless data communication may be achieved by the mobile device connecting to a wireless data network (e.g., a WiFi network) instead of a cellular telephone network.

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet.

Recently, the usage of mobile devices has increased dramatically with increases in their processing power and the number of applications available. Mobile devices have become essential communication and processing tools for the workplace and everyday life. With this increase in the use of mobile devices, the use of text and other forms of messaging is increasing in importance and utility. Today text messaging is the most widely used mobile data service on the planet.

In a conventional messaging system, messages are transmitted only when the user depresses the "send" key. While users may draft and store a message for transmission at a later date and time, the user must remember to retrieve the message body from storage and depress the "send" key to transmit the message. Users may compose a text message for later transmission, but forget to send the message at the intended date and/or time.

Conventional messages are transmitted immediately after users depress the "send" key. As a result, messages are received immediately (or after some short transmission delay) after users depress the "send" key. This may be undesirable when recipients are in a different time zone.

The various embodiments provide mobile devices with the ability to schedule the transmission of messages, particularly as a function of the device operating system, enabling users to compose messages for subsequent transmission. In this manner, users may compose a messages at their leisure. Scheduling of message transmission may be based upon date, time, user location, or some combination thereof. For example, a message may be scheduled to be sent on the intended recipient's birthday. As another example, users may schedule the transmission of messages so that the message will be sent upon nearing the location of intended recipients such as to invite an in-person meeting. As another example, users may schedule messages for transmission when they arrive at a destination, such as to automatically inform loved ones of their safe arrival. By providing the message transmission scheduling capabilities as part of the mobile device operating system, the embodiments allow other applications running on the mobile device, such as calendar and location sensing (such as GPS sensor) applications, to schedule or trigger the transmission of messages. Additionally, by including the message transmission scheduling capabilities into the mobile device operating system, application complexity can be reduced while providing users with common interface/activation procedures.

An embodiment method for scheduling the transmission of a message is illustrated in FIG. 1, which shows basic process steps that may be implemented on a mobile device. A user may initiate the messaging application on the mobile device, step 101, and draft a text message content, step 105. Alternatively, the user may select a pre-drafted "canned" message content available within the messaging application. Typically, "canned" messages may be simple, often repeated text messages such as "Can't talk right now," or "Call me later." The "canned messages" may also include messages previously drafted by the user and stored for future transmission. The selected "canned message" is stored in memory and may be retrieved from memory using address pointers associated with selection actions taken by the user. In alternative messaging services such as MMS or EMS, the drafting of message content may include the attachment of other media files to the message such as video, audio or other media files. The message content may include special text formatting (such as bold or italic), animations, pictures, icons, sound effects, special ring tones, graphics, audio and video files. For simplicity, the embodiments are disclosed with messages containing simple text (i.e., text messages), but one of skill in the art would appreciate that the messages may be augmented using MMS or EMS to include additional files in the message content.

Once the message is drafted or selected, the intended recipient or recipients of the message are identified by the user, step 106. It should be noted that in many messaging applications at least one addressee must be identified first, such as by entering the telephone number to which the message is directed, followed by entry of the message text. Thus, the order of steps 105 and 106 is arbitrary and will typically be performed in the reverse order from that illustrated in the figures. To identify the intended recipient(s), a user may manually enter the address (i.e., telephone number) of each intended recipient or may retrieve the address (i.e., telephone number) from a contacts application accessed by the messaging application.

In a conventional messaging application, the user would then depress the "send" key to transmit the drafted message to the intended recipient(s), step 116. In contrast to a conventional messaging application, the embodiment illustrated in FIG. 1 presents a menu display inquiring whether the user wishes to transmit the message immediately, step 110. This menu display may be presented on a user interface display screen of the mobile device. If the user responds to the menu by pressing a key associated with an affirmative response (i.e., step 110="Yes"), the message is transmitted immediately in the conventional manner, step 116. However, if the user responds to the menu by pressing a key associated with a negative response (i.e., step 110="No"), then the user is prompted to enter or select a date upon which the user desires to transmit the drafted message, step 111. The user may be prompted via a menu display shown on the user interface display screen of the mobile device. For example, the user may enter a date in some number format (e.g., month/day/year) using the keys of the mobile device, or use arrow keys to direct a cursor or other selection indicator over a calendar presented on the user interface display screen. Once the desired date has been typed in or is selected, the user may press a key to indicate that the message should be transmitted on the selected date. The selected date may be stored in a temporary memory location such as a memory buffer. The user may be then prompted to select a specific time upon which the user wishes to transmit the drafted message, step 112. For example, the user may enter a time in some number format (e.g., hour/minutes and AM/PM) using the keys of the mobile device, or use arrow keys to direct a cursor or other selection indicator over a time scale (e.g., a vertical or horizontal 24 hour timeline or a clock face display) presented on the user interface display screen. Once the desired typed has been typed in or is selected, the user may press a key to indicate that the message should be transmitted at the selected time. The selected time may be stored in a separate temporary memory location. If no specific time of transmission is selected, a default time of transmission may be stored, such as 12:00 AM of the user's home time zone. The user may also be optionally prompted with a menu presented on the user interface display screen to identify whether the message should be sent on a recurring basis or not, step 113. For example, a user may wish to transmit a message every year to an intended recipient on the intended recipient's birthday. By identifying the message as a recurring message, the message may be scheduled for delivery on a recurring daily, weekly, monthly, annual or other periodic basis that the user may select. The user selection entered in response to this menu option may also be stored in a separate temporary memory location. At some point the drafted message is then stored in memory, step 114. The message may be stored at the time it is generated, in response to the user selecting the delayed transmission option, or after all transmission parameters have been entered. Thus, step 114 may be accomplished at any point after entry of the message, step 105. The message may be stored along with other messages, with an index or memory pointer stored to be used to locate and recall the message at the time of transmission. The message transmission parameters, such as the intended recipients address (i.e., telephone number), transmission date, transmission time, and whether the message is intended to be recurring along with the periodicity of recurrence may be stored as a data record in a parameter data table in memory, step 115. Such a data record may include the address pointer indicting where in memory the drafted message is stored. Alternatively, the message may be stored in a data record which includes the full text message (including recipient(s) telephone number(s) and message text and graphics files if any) along with the message parameters of transmission date, transmission time and recurrence frequency, thus combining steps 114 and 115.

As an example of the embodiment method in practice, suppose a user is traveling from his home in Los Angeles to attend a business meeting in London. During his trip, the user has some downtime and elects to draft a text message to his daughter (intended recipient) wishing her good luck in a sporting competition that he will miss. The user wants to insure that the message will be received and read at a time that he knows his daughter will be available to receive the message and prior to the sports competition. Due to the time difference in London, if the user were to send the text message immediately, the message would arrive while his daughter is sleeping. However, the user will be in a business meeting when she wakes up and so will not be able to retrieve the stored text message and depress the "send" key. The user also knows that if he sends the message after the business meeting it will be too late. Thus, a conventional text messaging application would not be useful to the user in this situation. Using the present embodiment, the user may draft the text message before his business meeting and select the desired date and time to transmit the text message. In this manner, the user can schedule the delivery of his text message so that it is transmitted at the ideal time for reception by his daughter.

Figure 2:
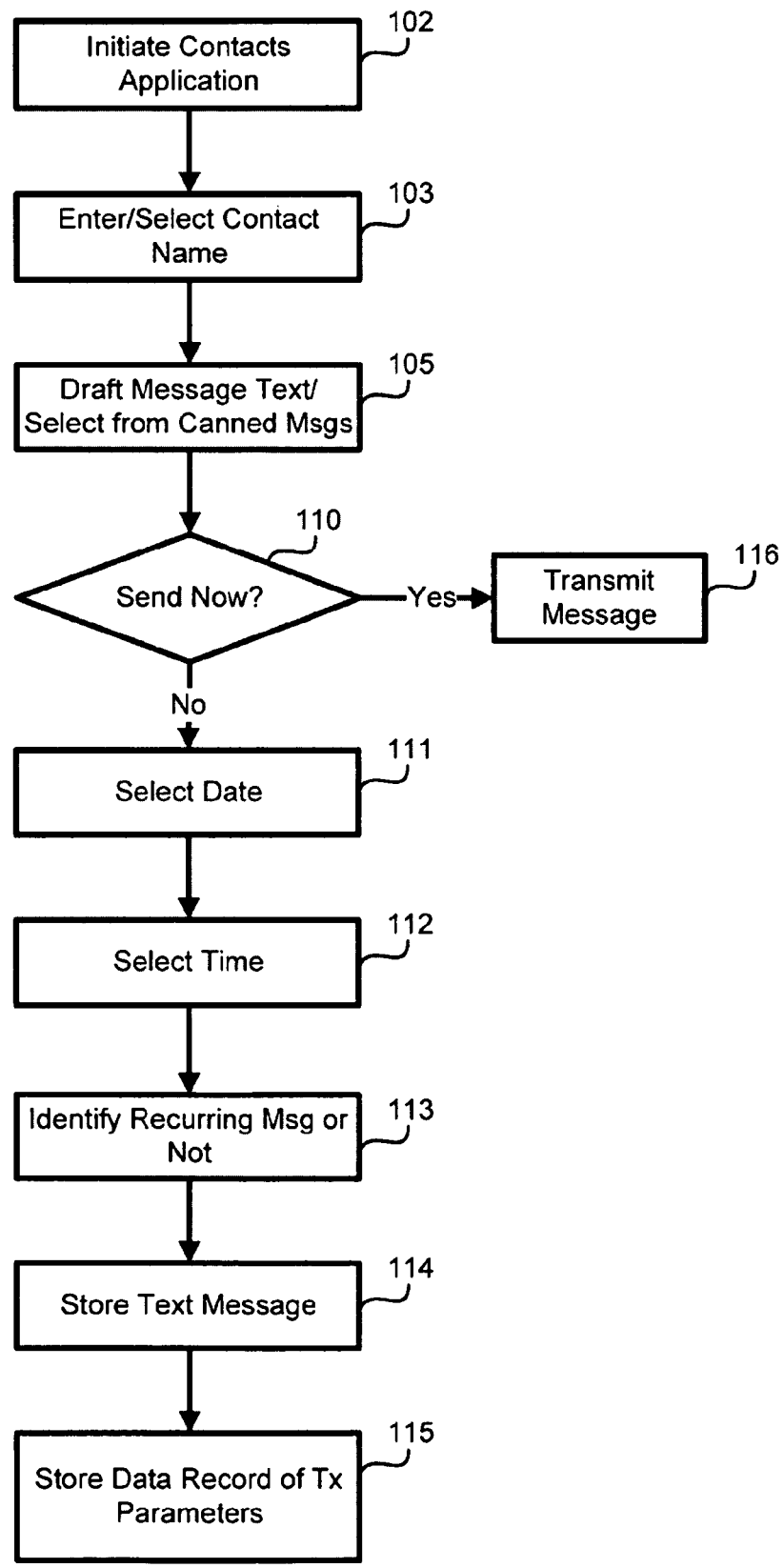
FIG. 2 is a process flow diagram of an alternative embodiment for scheduling the transmission of a text message on a mobile device from a contacts application.

An alternative embodiment for scheduling the transmission of a message is illustrated in FIG. 2, which shows basic process steps that may be implemented on a mobile device to schedule the transmission of a message from a contacts application. A user may initiate the contacts messaging application on the mobile device, step 102, and enter a new contact name and all relevant contact information or may select an existing contact name and edit the contact information, step 103. As part of the contact information, the user may draft a message to be sent to the entered/selected contact at a future date and/or time, step 105. The embodiment method then proceeds as described above with reference to FIG. 1 for steps 110-115.

As an example use of the alternative embodiment method illustrated in FIG. 2, consider a user entering or editing contact information for a particular user contact. The user may draft a personalized birthday greeting to be sent to the contact each year on the contact's birthday. By drafting the message ahead of time and selecting the date and time for transmission, the user can schedule the delivery of a personalized birthday greeting that will be transmitted automatically on the contact's birthday. One skilled in the art would appreciate that any scheduled message may be drafted for a user contact. For example, holiday or anniversary greetings may be scheduled for automatic transmission on the appropriate date. Additionally, reminders may be scheduled so they are timely sent to selected contact names.

Figure 3:
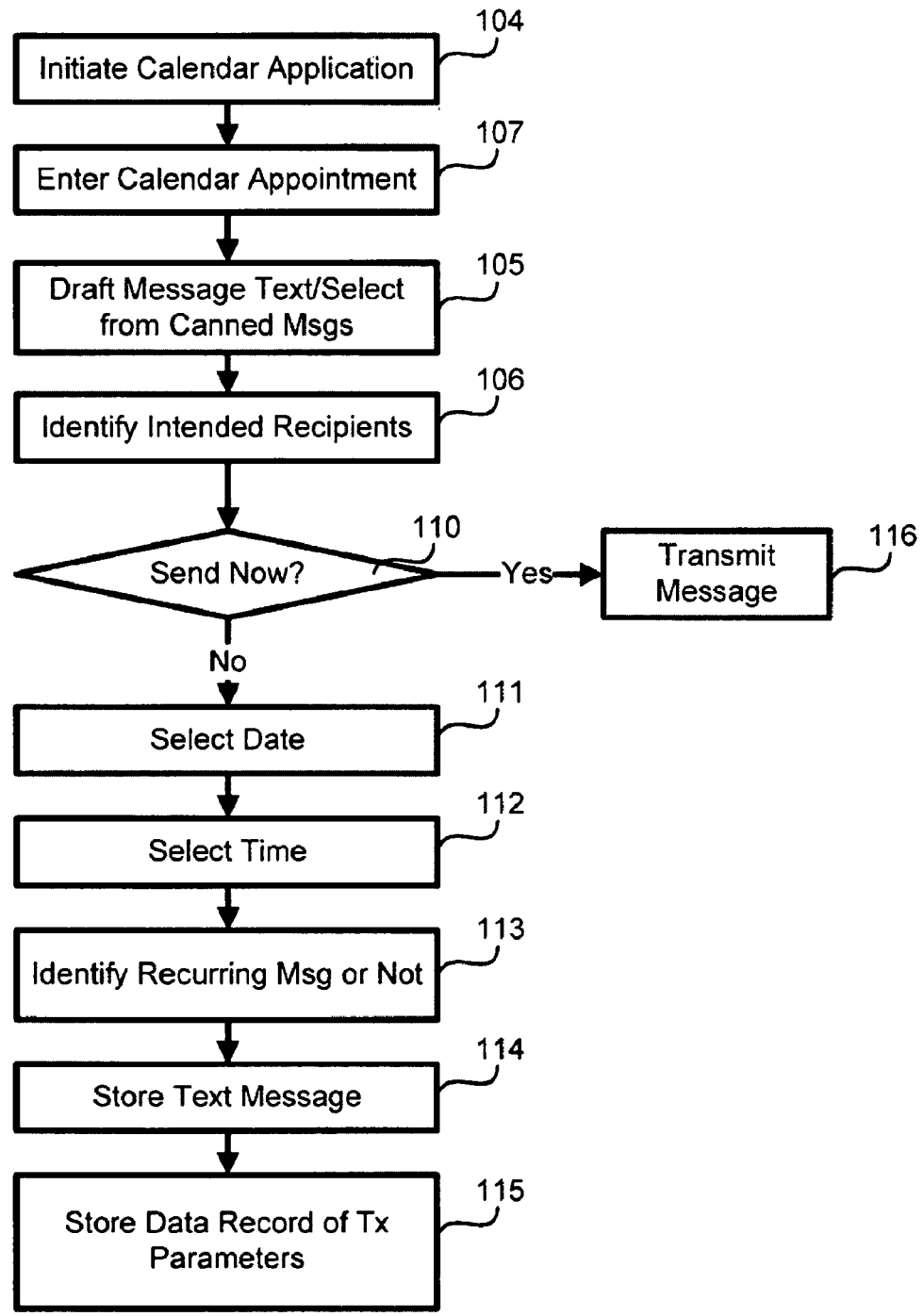
FIG. 3 is a process flow diagram of an alternative embodiment for scheduling the transmission of a text message on a mobile device from a calendar application.

An alternative embodiment for scheduling the transmission of a message from a calendar application is illustrated in FIG. 3. A user may initiate the calendar messaging application on the mobile device, step 104, and enter a new calendar appointment, or select an existing calendar appointment, step 107. Using the entered or selected calendar appointment information, the user may draft a message associated with the appointment, step 105. For example, the user may draft a message to be sent prior to the appointment time and date to the appointment participants (intended recipients) to remind them of the appointment or meeting. The user also identifies the intended recipients of the message, step 106, by manually entering the address (i.e., telephone number) of each recipient or by retrieving the address (i.e., telephone number) from a contacts application accessed by the messaging application. If the message is to be sent at a later time (i.e., step 110="No"), the user may enter a date and time for transmission or use the calendar information to set the date and time for transmission, steps 111, 112. The user may also identify if the appointment is recurring, or rely upon the calendared information for this determination, step 113. For example, if the calendar application may include an option for recording appointments as recurring, such information may be provided by the calendar application without the need for the user to separately indicate that the appointment is recurring. The embodiment method then proceeds as described above with reference to FIG. 1 for steps 114 and 115.

As an example use of the alternative embodiment method illustrated in FIG. 3, consider a user entering or editing calendar information for a particular appointment. The user may draft a reminder message to be sent to selected recipients reminding them of the calendar appointment. For example, the message may remind recipients to bring certain materials to the appointment. As another example, the message may inform recipients that the user will be unavailable during the calendared appointment. By drafting the message ahead of time and selecting the date and time for transmission, the user can schedule the delivery of a reminder message so that it will be transmitted automatically prior to the calendar appointment.

Any of the foregoing embodiments may be implemented on a mobile device, with drafted messages and transmission parameters stored in the memory of the mobile device.

Figure 4:
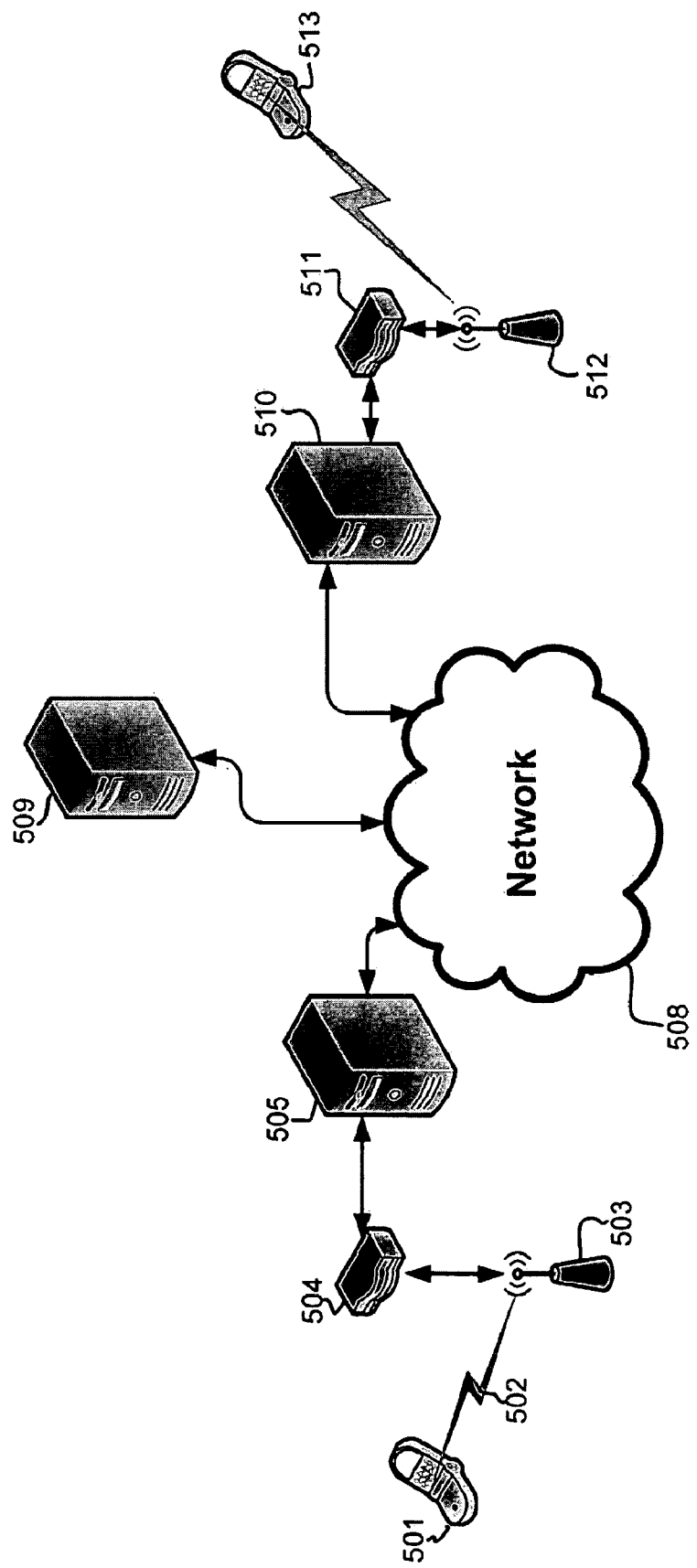
FIG. 4 illustrates a messaging system used for both conventional messaging applications and the various embodiments.

Text messages, whether transmitted immediately or at a scheduled day and time may be sent using a messaging system, such as conventional SMS text messaging system, as illustrated in FIG. 4. When a user's mobile device 504 transmits a message, the data signal 502 containing the address header and message payload (text message body) is transmitted from the mobile device's air interface and is received by a wireless communication base station 503. In a preferred embodiment, the wireless communication base station 503 will be a cellular telephone network tower. However, in alternative implementations the base station may be a Bluetooth transceiver, WiFi transceiver, or any other wireless transceiver coupled to a network configured to receive and deliver messages. The wireless communication base stations 503 may be coupled to a router 504 and wireless communication server 505 to connect to a communication network 508. Alternative paths to the communication network 508 may involve more or less communication equipment. For example, some wireless service providers may use additional servers to provide their users with access to the communication network 508. Alternatively, the wireless communication base station may permit a more direct link to the communication network 508. The communication network 508 may be the plain old telephone system (POTS) telecommunication network, or another communication network such as the Internet. The data signal 502 may be routed via the communication network 508 to a messaging server 509 for storage and subsequent transmission or may be sent directly to the intended recipient's mobile device 513 via a wireless communication server 510, router 511 and base station 512 according to known messaging protocols and methods. Once received by the base stations 503 and routed to the wireless communication server 505 via router 504, the data signal 502 may be transmitted to a destination with a variety of communication protocols. For example, the data signal 502 may be transmitted to the appropriate destination server (e.g., messaging server 509 or wireless communication server 510) via a TCP/IP protocol. Alternatively, connection oriented protocols such as public switched telephone network (PSTN) may be implemented to transmit and receive the data signals. One of skill in the art would appreciate that other communication protocols may be implemented to send and receive data signals between the mobile device 501, message server 509 and intended recipient's mobile device 513.

Figure 5:
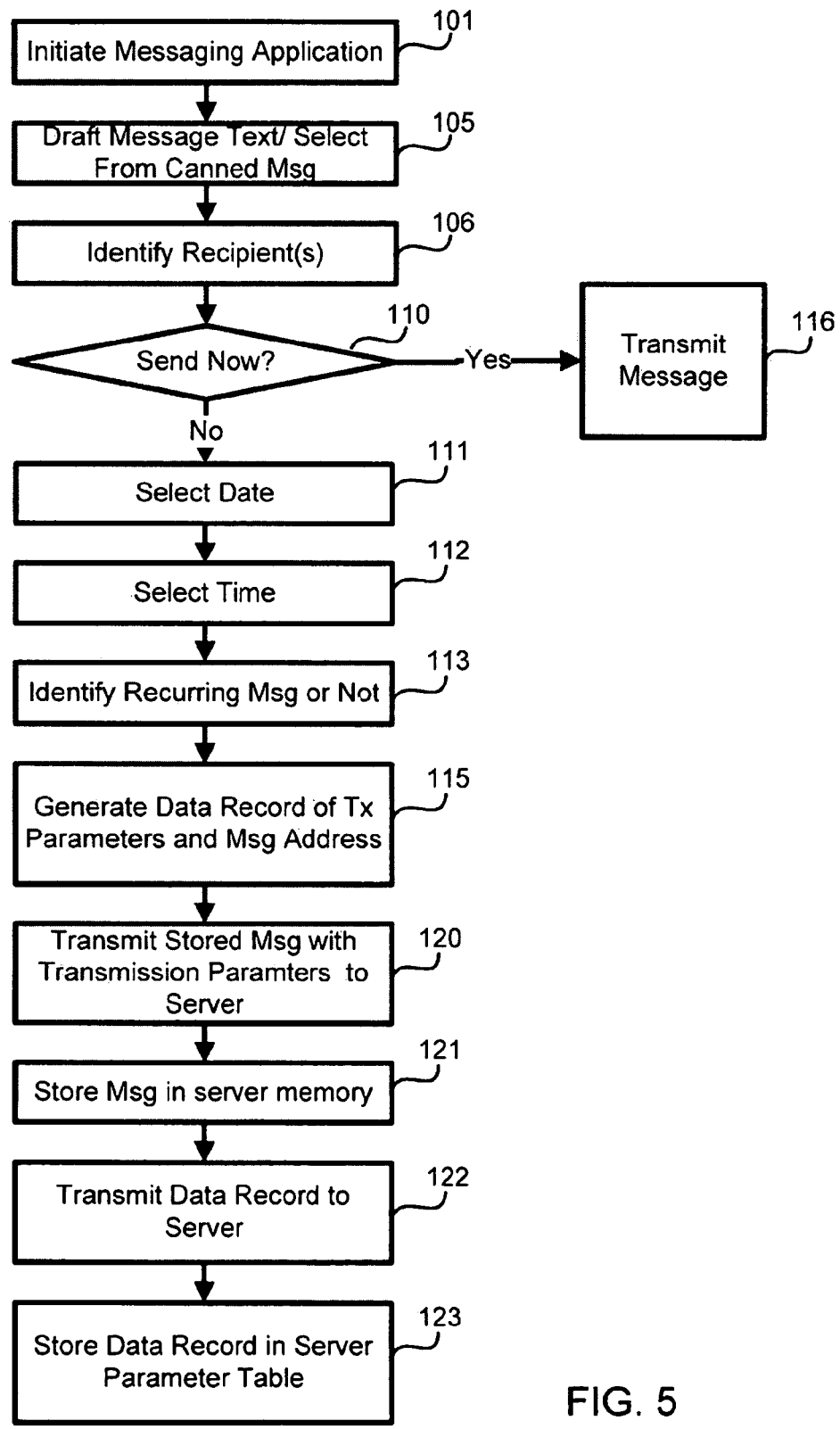
FIG. 5 is a process flow diagram of another embodiment method suitable for implementation on a text message server.

An alternative embodiment is illustrated in FIG. 5 which receives and stores the drafted messages and parameter table in a remote memory such as a server 509 for subsequent transmission. In this embodiment, the message to be sent at a later day and time is stored in a server 509 which has large memory capacity and is always coupled to the communication network 508 (unlike mobile devices which may be turned off). This embodiment reduces the information that must be stored in the limited memory space of the mobile device 501. In the same manner as described above with reference to FIG. 1, a user initiates the messaging application on a mobile device, step 101, drafts or selects the message text, step 105, identifies the telephone number of the recipient, step 106, elects to send the message at a scheduled time, step 110, identifies the transmission date, step 111, identifies the transmission time, step 112, and indicates whether the message is to be recurring, step 113. This information is used by the mobile device 501 to generate a message record including the identified transmission parameters, step 115. Once the message data record is assembled, the drafted message and transmission parameters (date and/or time of transmission) are transmitted to the server 509, step 120, 122. This transmission of the message to the server may be accomplished as a special SMS message, or may be transmitted using another data transmission method, such as a wireless Internet datalink or a cellular data network connection. For example, the message data record may be submitted to a server webpage using an Internet protocol (IP) address stored in the mobile device's memory. Upon reception by the server 509, the drafted message and associated transmission parameters are stored in memory, step 121, 123. In an embodiment illustrated in FIG. 5, the message may be transmitted to the server 509 in a first message, step 120, and the associated transmission parameters transmitted to the server 509 in a second data record message, step 122. The message transmission parameters (date and/or time of transmission) may be stored in a parameter data table in the server 509 memory, step 123. Such a parameter data table stored in server memory may contain the intended recipient addresses (i.e., telephone numbers), the date and/or time for transmission, and an address pointer to the location in server memory where the drafted message is stored. Alternatively, the message and transmission parameters may be stored together in a single data record. In this manner, once the user has drafted and scheduled the transmission of a message, the message and transmission parameters are stored in a remote server 509 memory to enable the server 509 to transmit the message at the scheduled date and time.

In this embodiment, the scheduled message may be initiated out of a contacts database application or calendar application on the mobile device 501 similar to the embodiments described above with reference to FIGS. 2 and 3. In such embodiments, the message may be drafted, addressed and/or scheduled using information entered or stored in the contacts and/or calendar application databases. Once the message is generated, it can be transmitted to the server 509 for subsequent transmission in the manner described above with reference to steps 120 through 123 in FIG. 5.

In an alternative embodiment, only the message body is transmitted to and stored in the server 509, steps 120, 121. The parameter table remains in the memory of the mobile device. As discussed in more detail below, when the mobile device 501 determines that a message should be transmitted, the mobile device sends a signal to the server 509 instructing it to transmit the message stored at the server 509. Such a signal to the server 509 includes sufficient information to enable the server 509 to locate the message in memory and address the message to the intended recipients.

FIG. 6A illustrates an exemplary data structure which may be utilized with the various embodiments for storing message transmission parameters. As would be understood by one of skill in the art, data may be stored in files with an organization referred to as a parameter data table 10A in which data related to each message are stored in individual data records represented as rows (e.g., 11, 13, 15, 17, 19, 21, 23, 25, 27), with each data record including a number of data fields represented as a number of columns (e.g., 12, 14, 16, 18). In a parameter data table 10A, a "Recipients" data field 12 may store the telephone number of the recipient or a reference to the intended recipient (e.g., a name) which is linked to the intended recipient's mobile device telephone number stored in a contacts application. A "Message Pointer" data field 14a may store the address pointer of the message body stored elsewhere in memory. In embodiments in which the message body is stored in the mobile device, the address pointer may be to the memory location within the mobile device. In embodiments in which the message body is stored in a server 509, the address pointer may be a file name, message name or other identifier that the server 509. The address pointer or message file name allows the mobile device or server, respectively, to retrieve the stored message body and match it up with transmission parameters stored in the parameter data table 10A for transmission. A "Date" data field 16 may store the scheduled transmission date, while a "Time" data field 18 may store the scheduled transmission time for the message. The transmission time may be specified in the form of hour, minute, and second data, and may also specify the time zone. In this manner, the user can elect to transmit a message at an ideal time for reception by the intended recipient. A "Recurring Event" data field 20 may be included, such as a flag that can be "set" to a value understood by applications as Yes, true, or on, such as 1, and "cleared" to a value understood by applications as no, false or off, such as 0. For example, the "Recurring event" flag may be set to yes, true, on or 1 when the user identifies the message as a recurring message in step 113.

As an example, the parameter table 10A contains a number of exemplary data records 11, 13, 15, 17, 19, 21, 23, 25, and 27. For example, data record 11 indicates that the user has drafted a message which is stored in a memory location denoted as "addr1." "Addr1" may refer to a memory location in the mobile device's memory in embodiments which store the message on the mobile device 501 or to a file name used to store the associate message in a remote server memory in embodiments which store the message in the server 509 memory. The data record 11 further indicates that the message stored at memory location "addr1" is intended for "Jerry, Bob, and Phil." Using these recipient identifiers, the mobile device can look up the telephone numbers associated with each of these intended recipients in the contacts application database stored on the mobile device. The data record 11 further indicates that the message is scheduled to be transmitted on Jan. 1, 2009 at 12:01:00 AM PST. Finally, the data record 11 indicates that the message is a recurring event and, accordingly, should be sent each January 1 at 12:01:00 AM PST. As another example, data record 17 stores the mobile device telephone number "212-555-1212" of the intended recipient. The data record 17 further indicates that the message is scheduled to be transmitted on Mar. 2, 2009 at 08:30:00 PM GST and is not a recurring event.

As mentioned above, scheduled messages and their associated transmission parameters may be stored together in a single data table, an example of which is illustrated in FIG. 6B. This data structure is similar to that described above with reference to FIG. 6A except that instead of storing a memory pointer or file name, each data record 11, 13, 15, 17, 19, 21, 23, 25, 27 includes the message 14b.

Figure 7:
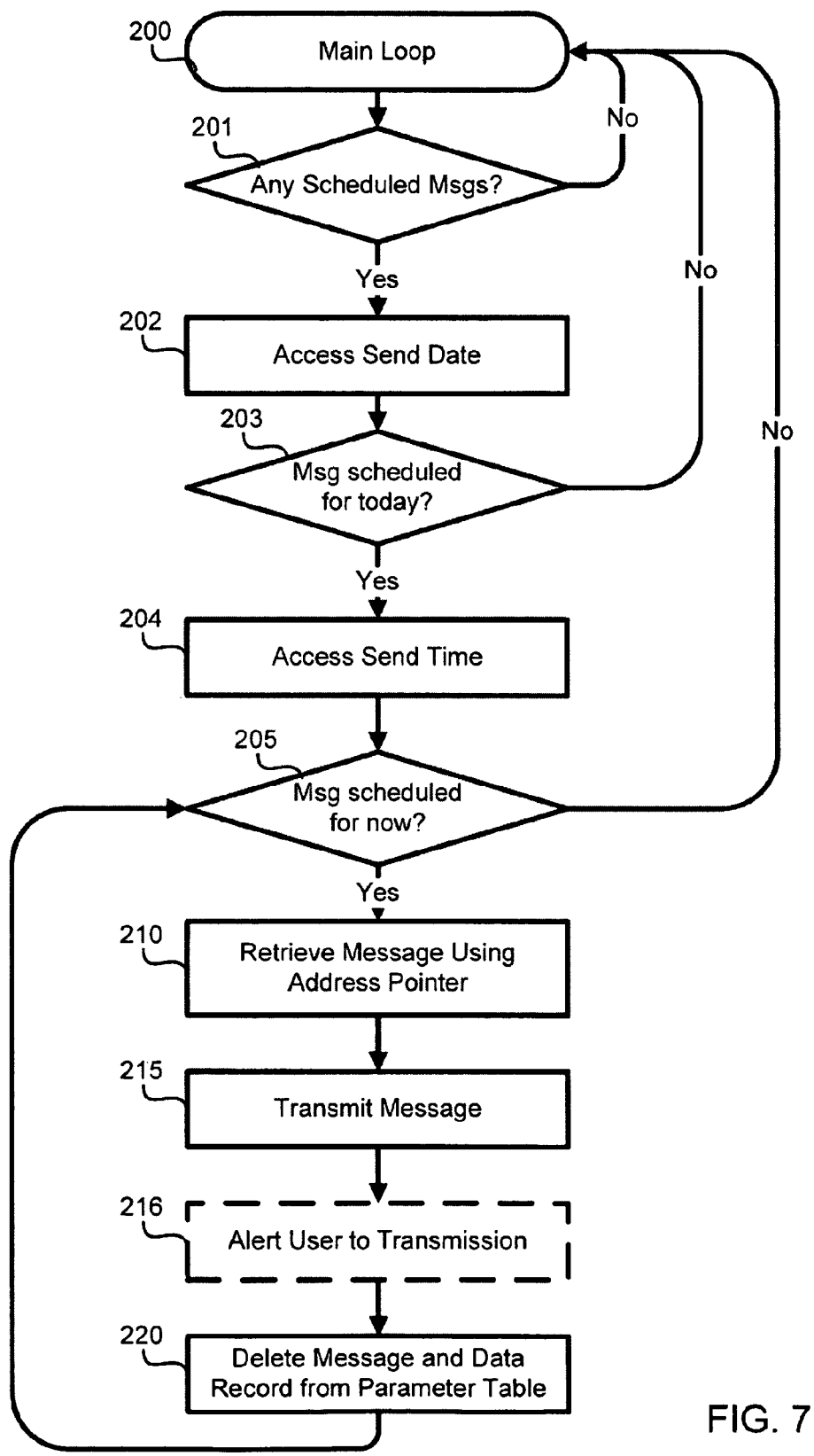
FIG. 7 is a process flow diagram of an embodiment method which transmits stored text message at a scheduled date and time.

FIG. 7 illustrates a process flow of steps that may be taken to transmit a stored message at a scheduled date and time. The process flow illustrated in FIG. 7 may be implemented by the processor of either the mobile device 501 or the server 509. As the operating system, which may implement a main loop 200, runs on the processor of the mobile device 501 or server 509, it will periodically determine if any scheduled messages are stored in memory, test 201. This determination may involve checking whether parameter table 10 contains any data records. If no data records are stored in the parameter data table 10 (i.e., test 201="No"), then there are no messages scheduled for transmission so the process flow returns to the main loop 200. If data records are stored in the parameter table 10 (i.e., test 201="Yes"), the processor accesses the scheduled send dates stored in the "Date" data field 16 to determine if any stored message is scheduled for transmission on the present day, step 202. This determination may be accomplished by comparing the stored dates to the current date stored in memory or maintained by the processor. If no stored message is scheduled for transmission on the present day (i.e., test 203="No"), the process flow returns to the main loop 200. If however, at least one stored transmission date equals the present date (i.e., test 203="Yes"), the processor accesses the send times stored in "time" data field 18 to determine if any message is scheduled for transmission the present instant, step 204. This determination may be accomplished by comparing the stored times to the current time indicated by a clock maintained by the processor. If no stored message is scheduled for transmission the present instant (i.e., test 203="no"), the process flow returns to the main loop 200. If, however, at least one stored transmission time equals the present time (i.e., test 205="Yes"), the processor retrieves the stored message body from memory using the address pointer or file name stored in the message pointer data field 14a of the parameter table, step 210. In embodiments in which the message text and files (if any) are included in the message parameter table 10b, the message text and files (if any) are recovered from the message text data field 14b. Once the message is retrieved from memory, the message may be transmitted to the intended recipients using the transmission parameters associated with the data record in parameter table 10, step 215. As an optional step, the user may be alerted with an audio or visual prompt or both that the scheduled message has been or is about to be transmitted, step 216. In embodiments where the message is stored and transmitted from the server 509, a signal may be sent to the mobile device 501 to display an audio or visual prompt or both to the user indicating that the server 509 has transmitted the message. After the message has been transmitted, the message body and data record may be deleted if the recurring event data filed 20 indicates that the message is not to be transmitted again (e.g., by the values "No" or 0), step 220. Once the message has been transmitted, the process flow returns to test whether there are any more messages scheduled for the present time, returning to step 205.

Figure 8:
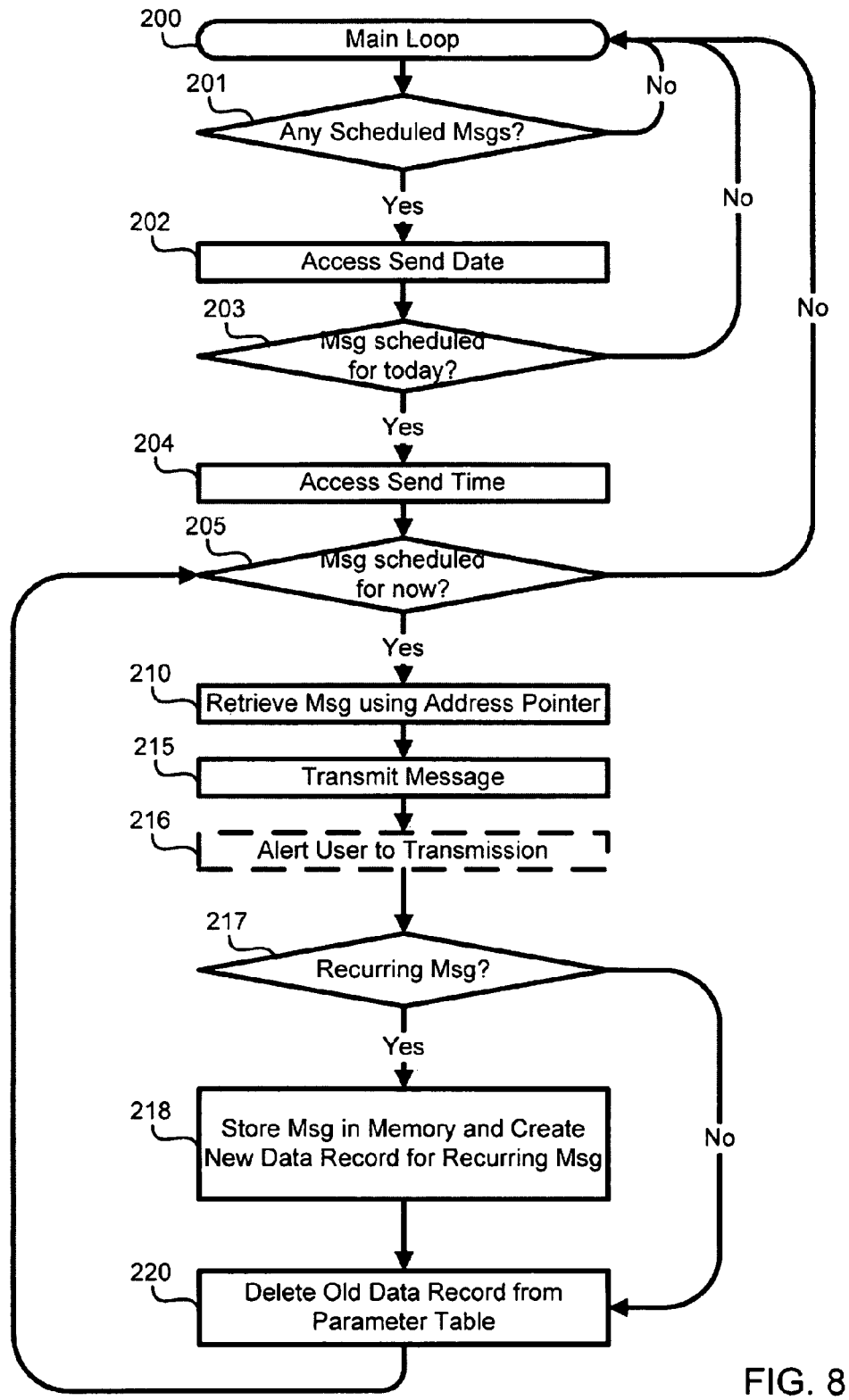
FIG. 8 is a process flow diagram of an embodiment method which allows users to schedule the transmission of recurring text messages.

FIG. 8 illustrates an alternative process flow for addressing recurring messages. The process flow of this embodiment is similar to the embodiment described above with reference to FIG. 7 for steps 201-215. Once the scheduled message is sent, step 215, the processor checks the recurring event data field 20 of the parameter table 10A or 10B to determine if the stored value (e.g., a flag) indicates that the message is intended to be a recurring transmission, test 217. If the recurring event data field 20 indicates the message is to be recurring (i.e., test 217="Yes"), then the message body may be stored again in memory (within the mobile device or in the remote server) in a new or the same location and a new data record stored in the parameter table 10, step 218. The new data record may be incremented to the next transmission date (such as by adding one day, one week, one month, or one year as appropriate) and will contain the address pointer or file name of the message body stored in memory. The other transmission parameters, such as intended recipients or time of transmission, may remain the same. Once the message body and new data record are stored in the parameter table 10, then the old data record may be deleted from the parameter table, step 220. Alternatively, the data record may be left unchanged (i.e., not deleted) with no new data record 10a, 10b created. If, however, the recurring event data field 20 flag is not set (i.e., test 217="No"), the sent message data record may be deleted without any new data record created in the parameter table 10*a*, 10*b*, step 220. Finally, the process flow returns to test whether there are any more messages scheduled for the present time, returning to step 205.

Figure 9:
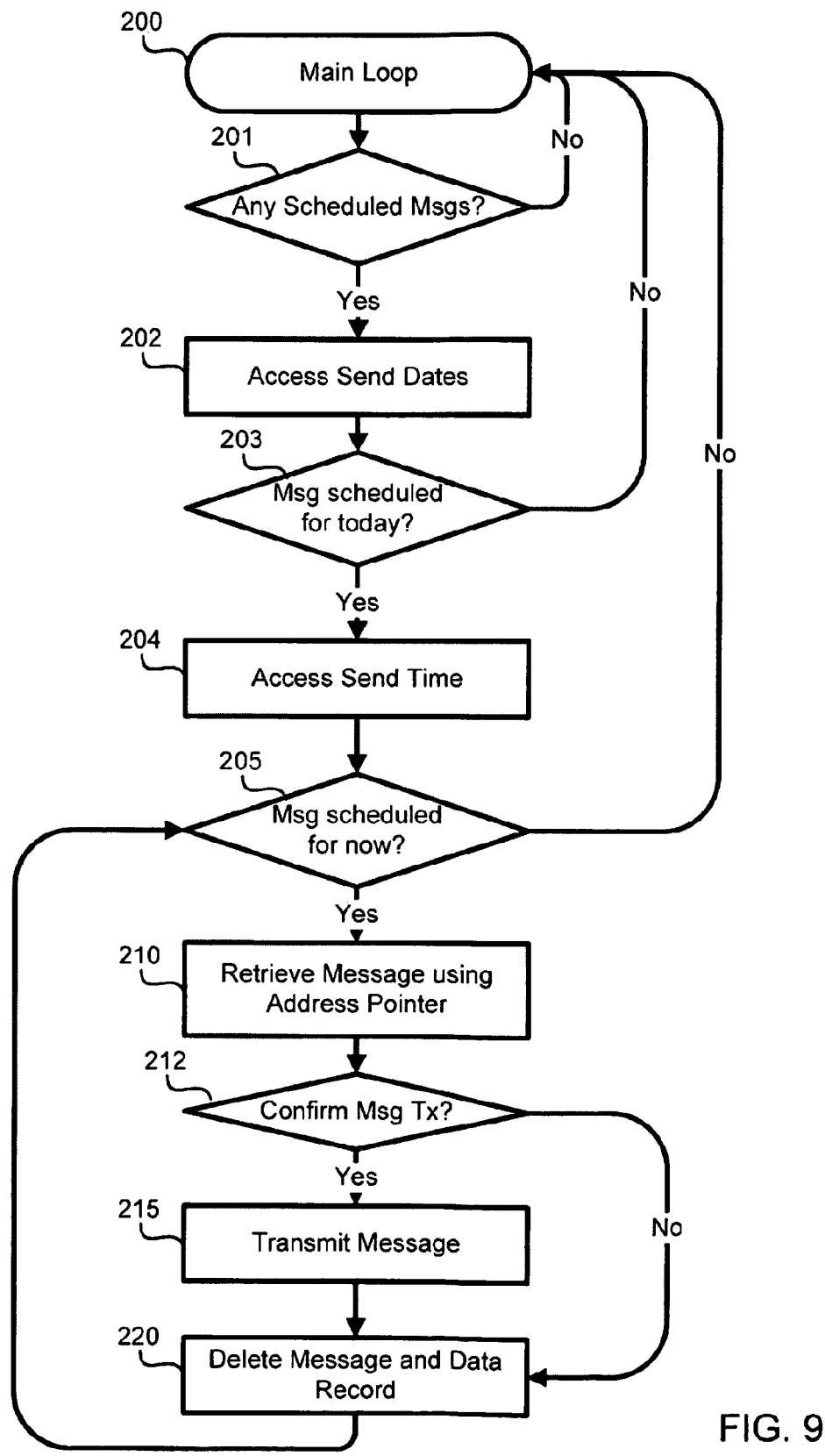
FIG. 9 a process flow diagram of an alternative embodiment method which provides users an opportunity to confirm a text message before it is transmitted.

FIG. 9 illustrates an alternative embodiment process flow which provides a user with an option to confirm the message before the message is transmitted. The process flow of this embodiment is similar to the embodiment described above with reference to FIG. 7 for steps 201-210. Once the message body has been retrieved from memory (in the mobile device or a remote server), step 210, the user is prompted to confirm the transmission of the message, test 212. The prompt may be in the form of a visual prompt displayed to the user on a user interface display with a request for the user to confirm by pressing a button that the message should be transmitted. If the user confirms the transmission of the message by providing the indicated response (e.g., pressing the "Y" key) (i.e., test 212="Yes"), the message is transmitted, step 215. However, if the user indicates that the message should not be transmitted (e.g., by pressing the "N" key) (i.e., test 212="No"), then the stored message body and data record may be deleted from the parameter data table, step 220. A menu option may also be presented to a user indicating that a message should not be transmitted to allow the user to delete or retain the message. Finally, the process flow returns to test whether there are any more messages scheduled for the present time, returning to step 205.

The embodiment method illustrated in FIG. 9 allows the user to provide a final confirmation that the scheduled message should be sent. This embodiment addresses the problem that can arise when users decide they no longer wish to send a message but forget that the message is scheduled for future transmission.

In an implementation of the foregoing embodiments, the processing of messages for storage and scheduled transmission are accomplished within the operating system of the mobile device 501. This implementation reduces the complexity of the messaging application software, and capitalizes on the operating system's basic functionality.

Figure 10:
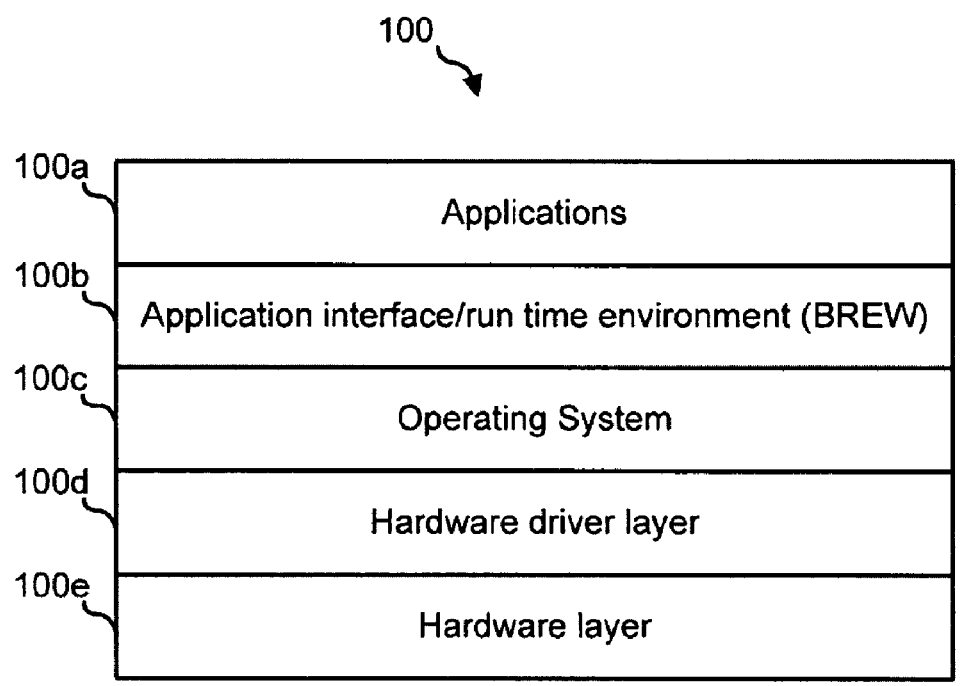
FIG. 10 is a software architecture diagram illustrating a software organization of a mobile device according to an embodiment.

A typical software architecture 100 of a mobile device is illustrated in FIG. 10. Software operating on a mobile device is typically organized into a hierarchy of software layers 100*a*-100*d* to enable applications 100*a* to interface with the mobile device hardware, such as a display, keypad, transceivers, and other circuitry (e.g., a GPS receiver). Hardware elements, such as keypads, displays and circuitry are organized in a hardware layer 100*e* which may communicate with software through specialized hardware interface software organized in a hardware driver layer 10*d*. An operating system 100*c* interfaces with hardware drivers 100*d* and with applications 100*a*, providing the basic input/output and housekeeping functionality of the mobile device. An application interface or run time environment layer 10*b*, such as the Basic Runtime Environment for Wireless—BREW®, may be included in order to simplify the interface of applications 100*a* with various mobile device operating systems 100*c*.

In an implementation, when a user elects to schedule a message for later transmission, the messaging application within the applications layer 100*a* may pass the message and related information to functionality within the operating system layer 100*c* for storage and later transmission. Since the operating system 100*c* maintains clock and date information, and has access to all applications and databases (e.g., a contacts database and GPS receivers), the operating system is able to monitor such information for compliance with transmission parameters. This reduces the complexity of message applications. Thus, referring to FIG. 2, the processes of storing the message, step 114, and transmission parameter data, step 115, may be performed by operating system functionality. Similarly, referring to FIG. 7, each of the steps 201-220, may be performed by the operating system.

In an embodiment, the process steps of periodically comparing the present time and/or date to time and date transmission criteria for stored messages are performed within the operating system. If such a comparison is positive (i.e., the present time and date matches one or more message transmission criteria), then the operating system may activate the messaging application, and identify the message(s) to be transmitted. The messaging application may then transmit the message(s) automatically or present a prompt to the user to confirm transmission of the messages. By incorporating the time and date comparison steps into the operating system, the messaging application can be simplified (obviating a need to access memory not normally accessible to such applications as well as a need to maintain the application running in the background at all times to monitor time and date parameters).

In an alternative embodiment users may draft messages in advance and schedule their transmission to occur when the mobile device is at a particular location. This embodiment may use location information in the form of geographic (e.g., GPS location) coordinates or cellular telephone transmission cell identifiers ("CellID") information. If the mobile device's location matches a stored location in a transmission parameter data table the stored message may be transmitted. For example, users may set messages to be transmitted to certain recipients when the mobile device determines it is near those recipients, such as to inform them of the user's proximity. For example, a user may have friends in number of cities. If the user travels extensively, he may wish to inform his friends when he has traveled to their cities in the event they might be able to meet for dinner or other social endeavors. To do this, the user may draft messages to the effect that "I am in town, let's get together" and store such messages for later transmission based upon a geographic transmission parameter associated with each friend. Such geographic transmission parameters may be in the form of geographic coordinates (e.g., the geographic location of each friend and a radius value) or a CellID of the cellular telephone cell zone of each friend's home. When the user enters the vicinity of a friend, the geographic transmission parameter will be satisfied and a message may be automatically transmitted to the corresponding recipient. In this manner, the user may improve his social and networking relationships.

Figure 11:
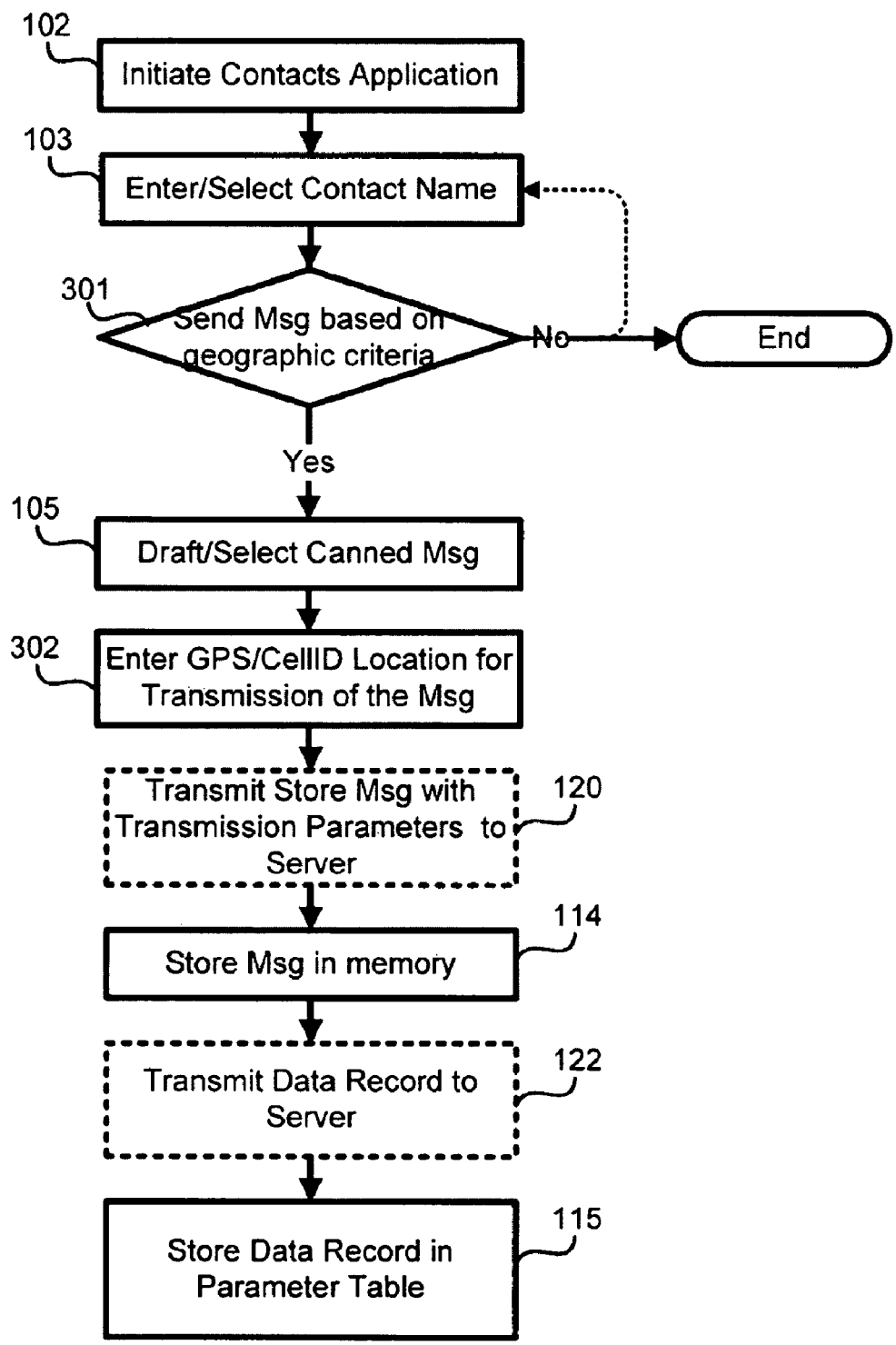
FIG. 11 is a process flow diagram of steps performed to schedule the transmission of a text message based upon the user's location.

FIG. 11 illustrates a process flow diagram of the steps performed to schedule the transmission of a message based upon the user's location. Similar to the embodiment method illustrated in FIG. 2, the user may initiate a contacts application on the mobile device, step 102, and enter a new contact or edit an existing contact, step 103. After the user has completed the entry or editing of the contact information, the user may be asked by the contacts application whether the user wishes to send a message to the entered/selected contact name whenever the user is in the vicinity of the entered/selected contact's home address location, test 301. This inquiry may be in the form of a menu or prompt presented on the user interface display requesting the user to indicate with the press of a key whether a message should be associated with the new or edited contact. If in response to this inquiry the user indicates no desire (e.g., by pressing the "N" key) to transmit a message to the contact (i.e., test 301="No") then the contact application may terminate or return to a new contact entry/edit menu. However, if the user answers in the affirmative (e.g., by pressing the "Y" key), indicating a desire to send a message to the entered/selected contact name based upon a geographic transmission criteria (i.e., test 301="Yes"), the user may be prompted to draft a message, step 105. Alternatively, the user may select a pre-drafted "canned" message stored in memory such as by an original equipment manufacturer (OEM) or previously drafted and stored by the user. Once the message body is drafted or selected, the user may prompted to enter the GPS location or CellID that will prompt the transmission of the message, step 302. This geographic position or CellID may be anywhere in the world. For example, the geographic transmission criteria may be a particular location of importance to the sender and the recipient, or the sender's home to inform the recipient of a safe return from an extended trip. In some situations the geographic transmission criteria may be a location associated with the recipient, such as to inform the recipient of the user's proximity. In such situations, the GPS location or CellID transmission criteria may be derived from the stored contact information associated with the recipient. For example, the city name stored in the contacts database can be used as the transmission criteria so that the corresponding message is transmitted whenever the GPS location or CellID fall within the recipient's city.

The Global Positioning System, known familiarly as GPS, is a well known system which utilizes at least three satellites in geosynchronous orbit to triangulate the position of a GPS receiver. GPS receiver units are very popular and have been included within many mobile device chipsets to provide location information for use in a number of applications. The typical accuracy range of a GPS location is approximately 15 meters (50 feet) or better. Accordingly, a proximity radius may be included as part of the geographic transmission criteria (e.g., by default or user selection) so that whenever the user is within a certain number of miles of the selected GPS location, the stored message will be sent. As an example, the GPS coordinates of the center of a city may be entered as the transmission criteria with a proximity radius set to be 50 miles. In this example, any time the user's mobile device is within 50 miles of the city center GPS coordinates, a message may be transmitted to the corresponding recipient.

While the CellID refers to the unique identifier of a cell tower in a cellular telephone network, a similar identifier may be used in other cellular data communication systems such as WiFi and WiMax systems. The area in which a mobile device can communicate with a given cell tower is called a radio cell, and the totality of radio cells creates the cellular network. While connected to a cellular network, a mobile device is often within range of more than one cell tower, but it maintains a primary link with only one cell tower at a time. In order for the mobile device to know with which tower it should maintain its primary link, the cellular network provides the CellID of the proper tower to the mobile device. The CellID is stored in a mobile device's memory in a location that is accessible to part of the mobile device which is responsible for maintaining the primary link, the air interface, but is not available to other applications. In contrast to GPS coordinate information, the communication range of a radio cell may be anywhere from 1-50 miles depending on the type of technology in use and the specifics of the terrain. Accordingly, more than one CellID may be identified as the geographic transmission criteria in order to encompass a reasonably large transmission criteria area. In this manner, whenever the mobile device is informed that it should communicate with a cell tower having a selected CellID the message will be transmitted to the particular contact.

After the GPS location or CellID is entered, step 302, the message body is stored in memory and assigned an address pointer indicative of the memory location, step 114. The entered/selected contact name, GPS/CellID location transmission criteria, and the address pointer are stored as a new data record in a parameter table 10c (see FIG. 13A) stored in memory, step 115. Alternatively, the message may be stored in a data record 10d (see FIG. 13B) which includes the full message along with the message transmission parameter, thus combining steps 114 and 115.

In an alternative embodiment, the message and transmission parameters may be stored in a remote server 509 memory for subsequent transmission. This embodiment conserves memory resources on the mobile device 501. This embodiment operates substantially the same as described above with reference to FIG. 11. However, after the GPS location/CellID geographic transmission criteria have been entered, step 302, the message body and transmission parameters may be transmitted to a server 509 for storage in the remote server memory, step 120. The message body may be stored in a remote server memory and assigned file name indicative of the server memory location. The address of the entered/selected contact name, GPS/CellID transmission criteria, and the message file name may be stored as a new data record within a parameter table 10c (see FIG. 13A) and transmitted to the server 509, step 122 for storage in server memory, step 115. Alternatively, the message may be stored in a data record 10d (see FIG. 13B) which includes the full message along with the message transmission parameter that is transmitted to the server 509, thus combining steps 120, 114, 122 and 115.

As a mobile device 501 changes location (such as occurs when the user is in a moving car), the mobile device occasionally needs to change its primary communication link from one cell tower to another. This process of changing primary links is called a "handoff." A cellular network may monitor the movement of a mobile handset within a radio cell by monitoring the relative signal strength of the communication signal received from the mobile handset. As the signal strength of the communication received from a mobile handset at a first cell tower decreases the signal strength received at a second cell tower may increase. In such instances, the cellular network may deem a handoff from the first cell tower to the second cell tower to be appropriate. To accomplish a handoff, the cellular network can notify the mobile handset when it should drop the link with the first cell tower and establish a communication link to the second tower. Since the network usually initiates a handoff because the mobile handset is moving from one cell to another, the CellID provides information that can be used to localize the mobile handset within the radius of cell zones. The CellID of the cell tower generating the primary link may be stored in a CellID buffer of the mobile device 501.

Figure 12:
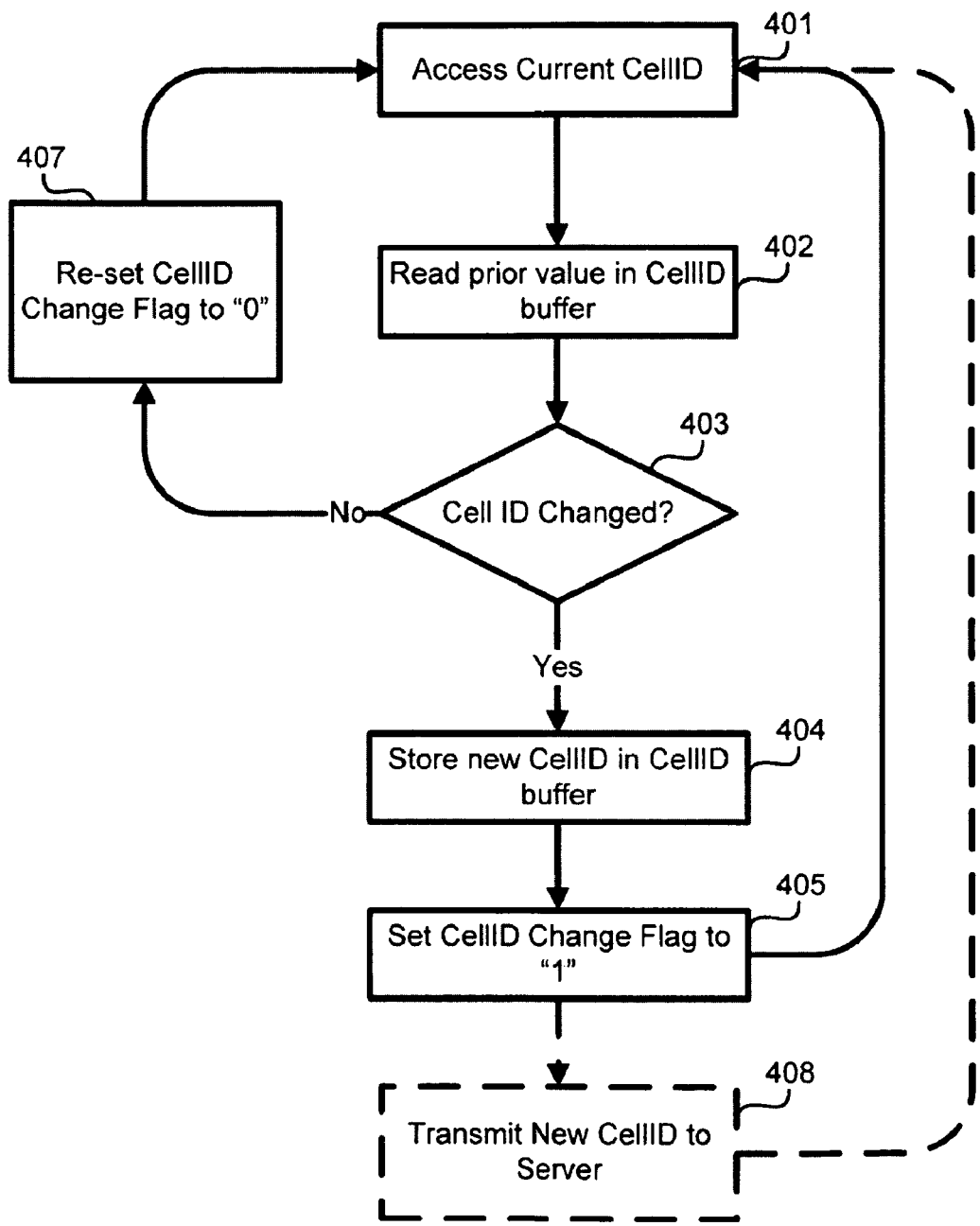
FIG. 12 is a process flow diagram of a method for a CellID monitor that may be implemented on a mobile device.

Similarly, as the mobile device 501 changes location, the GPS receiver may continuously update the GPS coordinates stored in a location buffer of the mobile device. For a mobile device to keep the GPS location/CellID buffer populated with the current GPS location/CellID value, the system, runtime environment or an application may monitor the GPS receiver or primary communication link CellID and post either the GPS location or the CellID to an application-accessible memory, such as by adding a new record to the GPS location/CellID buffer, each time a change occurs, such as when a handoff occurs. An embodiment method providing this capability is illustrated in FIG. 12, which shows example process steps for a CellID monitor that may be implemented on a mobile device. One of skill in the art would appreciate that similar steps may be implemented to monitor a GPS location on a mobile device.

In the illustrated embodiment, a CellID monitor executing on the mobile device accesses the current CellID in the air interface memory, which is the CellID of the tower with which the mobile device has its primary link, step 401. The CellID monitor may also read an application-accessible CellID buffer to retrieve the CellID of the tower the mobile device was connected to the last time the CellID monitor executed, step 402. The CellID monitor may then compare the current and previous CellIDs to determine if the CellID has changed, step 403. If the two CellID values are equal (i.e., test 403="No"), then the mobile device has not connected to a new cell tower since the last time the CellID monitor has executed, so a changed CellID flag is reset to "0", step 407 and the process is repeated periodically by returning to step 401 in order to promptly detect a change in the CellID such as from a cell handover event.

If the two CellID values are not equal (i.e., test 403="Yes"), this indicates that a handoff has occurred, so location-based applications on the mobile device may be notified. To accomplish this notification, the CellID monitor stores the new CellID in the CellID buffer, step 404. A CellID changed Flag may be set (such as by storing a "1" in a memory location), step 405. After the CellID changed flag is set to "1", the process is repeated periodically by returning to step 401 in order to promptly detect a change in the CellID such as from a cell handover event.

In embodiments in which a message and transmission parameters are stored in and transmitted from a remote server 509, the method may include the step of transmitting the new CellID to the server, step 408, before returning to step 401.

FIG. 13A illustrates an exemplary parameter table 10c which includes a "GPS location/CellID" data field 22 for storing the geographic transmission criteria for a message. The parameter table 10c is similar to the parameter table 10c illustrated in FIG. 6A, with the exception of the additional "GPS location/CellID" data field 22, and new exemplary data records 29-35. The "GPS location/CellID" data field 22 may store the GPS location or CellID of the geographic transmission criteria of a message so that when the user enters the vicinity of the GPS location/CellID stored in data field 22, the corresponding message stored in the memory location denoted by the address pointer data field 14a is sent to the entered/selected contact.

As an example of the modified parameter table 10c, new exemplary data records 29-35 are stored. For example, data record 29 indicates that the user has drafted a text message which is stored in a memory location denoted as "addr10." The data record 29 further indicates that the text message stored at memory location "addr10" is intended for "Bob." The mobile device telephone number associated with this contact may be obtained from the contacts application using "Bob" to locate the appropriate contact record. The data record 29 further indicates that the text message is scheduled to be transmitted whenever the user's mobile device is in the vicinity of "Washington D.C." as indicated either by a GPS location or CellID. In this example, whenever the user's mobile device 501 is in the vicinity of Washington D.C., the text message stored at the location associated with the address pointer 10 will be transmitted to the user's contact named "Bob" (intended recipient). Similarly, if the user's mobile device 501 is in the vicinity of London, the text message stored at the location associated with the address pointer 11 will be transmitted to the user's contact named "Charles."

As mentioned above, scheduled messages and their associated transmission parameters may be stored together in a single data table 10d, an example of which is illustrated in FIG. 13B. This data structure is similar to that described above with reference to FIG. 13A except that instead of storing a memory pointer or file name of the text message, each data record includes the message text 14b itself.

Figure 14:
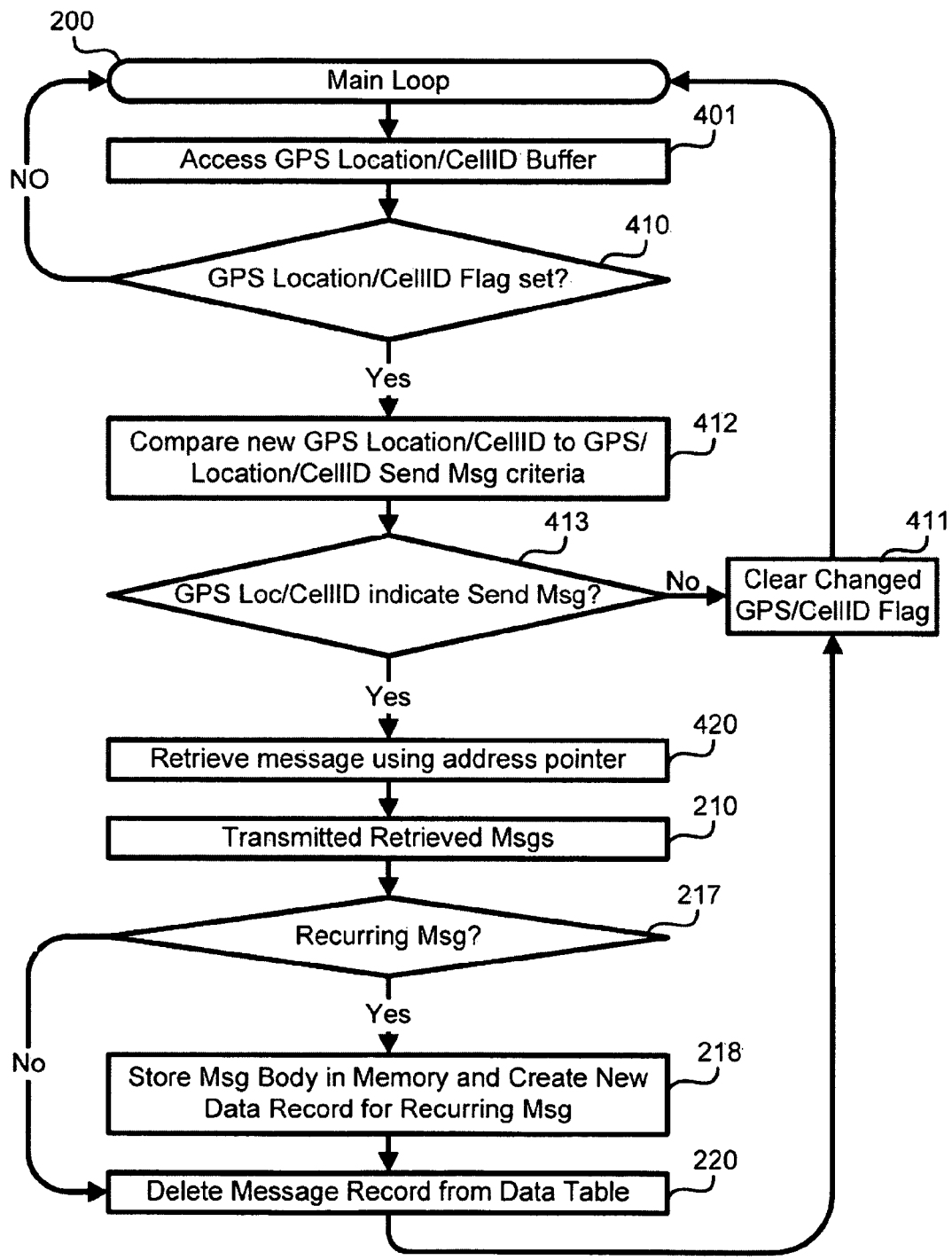
FIG. 14 is a process flow diagram of a method for transmitting pre-drafted messages based upon the location of the user.

FIG. 14 is a process flow diagram illustrating steps which may be taken by the processor of either the mobile device 501 or the server 509 to determine whether to transmit a pre-drafted message to a recipient based upon the location of the mobile device. As the operating system, which may implement a main loop 200, runs on the mobile device 501 processor or server 509 processor, it will periodically access the GPS location or CellID buffer to determine the current location of the user's mobile device 501, step 401. Additionally or alternatively, the changed GPS location or CellID Flag may be checked to determine if the user's mobile device 501 has traveled to a new location, test 410. If the flag is not set (i.e., test 410="No") then the user's mobile device 501 has not changed location and no further action is necessary, so process flow may return to the main loop 200.

If the changed GPS location or CellID Flag is set (i.e., test 410="Yes") then the mobile device 501 has changed locations and a check is needed to determine if the new location warrants the transmission of any scheduled messages. To accomplish this, the current GPS location/CellID obtained in step 401 is compared to the GPS locations/CellIDs geographic transmission criteria stored in the parameter table 10c, 10d, step 412. If none of the GPS locations/CellIDs geographic transmission criteria stored in data records of the parameter table 10c, 10d match the current GPS location/CellID, (i.e., test 413="No"), then there is no further action necessary, so the processor clears the GPS location/CellID changed flag, step 411, after which the process flow may return to the main loop 200.

If any of the GPS locations/CellIDs geographic transmission criteria stored in data records of the parameter table 10c, 10d matches the current GPS location/CellID (i.e., test 413="Yes"), the message is retrieved from memory using the address pointer or file name stored in the parameter table, step 420. The message is then transmitted to each of the intended recipients stored in the parameter table, step 210. Because the messages in this embodiment are meant to be sent anytime the user's mobile device 501 moves into the vicinity of a entered/selected contact, the process checks recurring message data field 20 of the parameter table 10c, 10d to determine if a flag is set indicating that the message is intended to be a recurring transmission. If data field 20 flag indicates a recurring message (i.e., test 217="Yes"), the message body may be stored in memory in a new location and a new data record is stored in the parameter table 10c, 10d, step 218. Once the message body and new data record is stored in the parameter table 10, then the old data record may be deleted from the parameter table, step 220. Alternatively, the data record may be left unchanged (i.e., not deleted) with no new data record created. If, however, the recurring event data field 20 flag is not set (i.e., test 217="No"), the sent message data record may be deleted without any new data record created in the parameter table 10c, 10d, step 220. The processor clears the changed GPS location/CellID flag, step 411, after which the process flow may return to the main loop 200.

Figure 15:
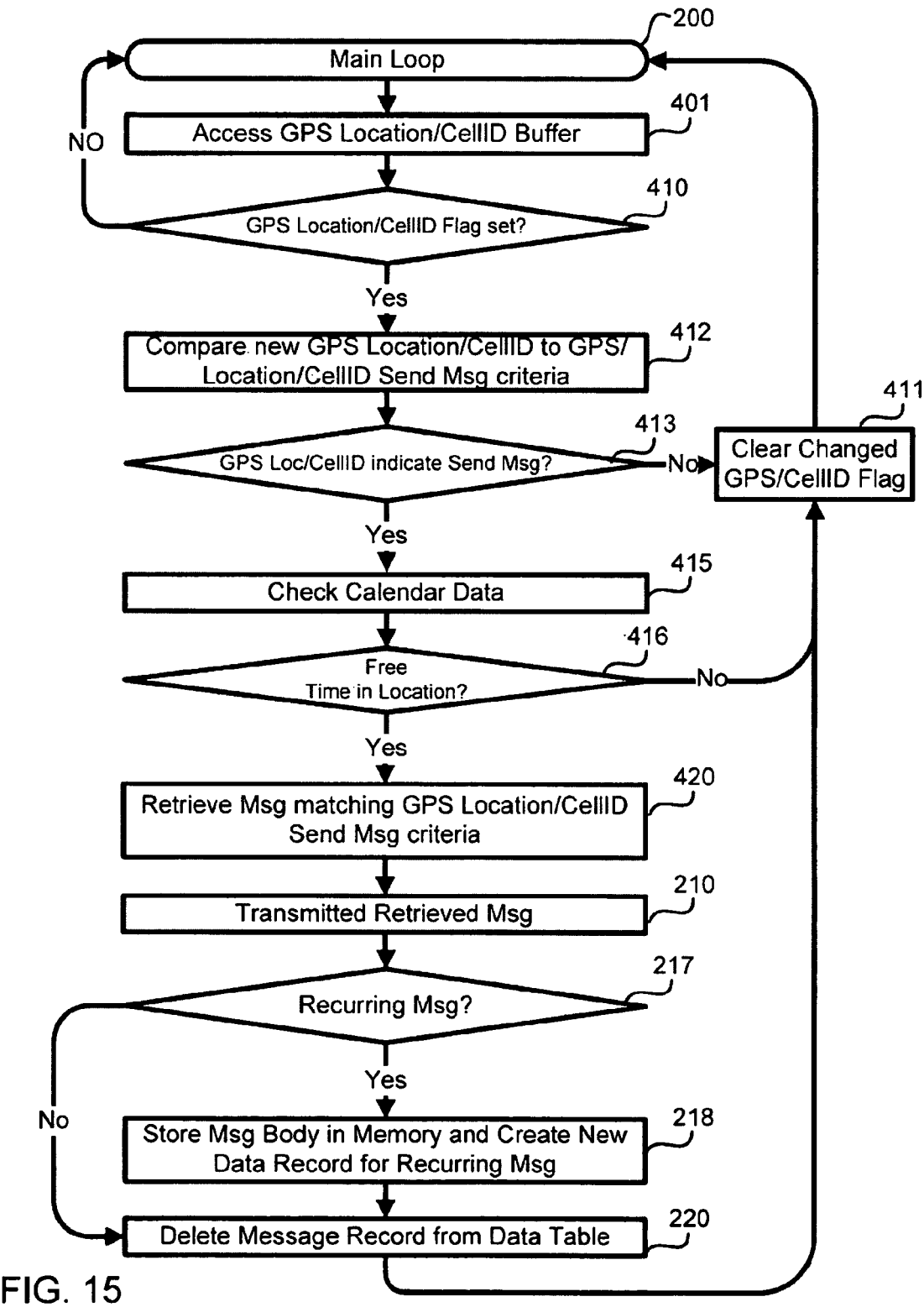
FIG. 15 is a process flow diagram of an alternative method for transmitting a pre-drafted message based upon the location of the user.

FIG. 15 is a process flow diagram illustrating steps that may be taken by the processor of either the mobile device 501 or the server 509 in an alternative embodiment to determine whether to transmit a pre-drafted message to a recipient based upon the location of the mobile device 501. This embodiment is similar to the embodiment described above with reference to FIG. 14 but includes additional steps in which the processor further determines whether the stored message should be transmitted based upon user's availability. This embodiment is particularly useful in the situation where the message is to be sent to a recipient based on the user being nearby. Since such a message is likely to prompt a reply or an invitation to meet, it may be helpful to confirm before sending the message that the user would be available to accept such an invitation. To do this, the processor accesses calendar data stored in a calendar application for the current date and time, step 415. The purpose of the calendar check is to determine if the user has a scheduled conflict that would preclude meeting with entered/selected contacts in the current GPS/CellID location. For example, the user may only be in the location for a short amount of time and thus could not meet with anyone. As a further example, the user may not want to send a message if he is only in the airport during a layover between connecting flights. If the calendar data indicates a schedule conflict or insufficient free time in the current GPS/CellID location (i.e., test 416="No") then the processor clears the changed GPS location/CellID flag, step 411, and returns process flow to the main loop 200. If however, the user's calendar indicates that the user has free time available (i.e., no schedule conflict is stored in the calendar data) in the current GPS/CellID location (i.e., test 416="Yes"), then the process may continue to retrieve and transmit the message body to the intended recipients as described above with reference to FIG. 4 for steps 420 and 210-220.

The embodiment methods and data structures illustrated in FIGS. 1-15 are intended only to be illustrative examples because the subject matter of the claims may be implemented in software operating on handsets with a variety of similar methods, algorithms, data structures and software routines. For example, the method steps illustrated in FIGS. 1-15 need not be accomplished in the order described or illustrated in the figures, may be substituted or deleted, or may be implemented in software or hardware as one of skill in the art would appreciate. Thus, the foregoing embodiments are not intended to limit the scope of the claims.

In an embodiment, the process steps of periodically comparing the present GPS location or CellID to geographic transmission criteria for stored messages are performed within the operating system. If such a comparison is positive (i.e., the present location matches geographic transmission criteria for one or more messages), then the operating system may activate the messaging application, and identify the message(s) to be transmitted. The messaging application may then transmit the message(s) automatically or present a prompt to the user to confirm transmission of the messages. By incorporating the geographic location/criteria comparison steps into the operating system, the messaging application can be simplified (obviating a need to access memory not normally accessible to such applications as well as a need to maintain the application running in the background at all times to compare the present location against geographic transmission criteria).

Figure 16:
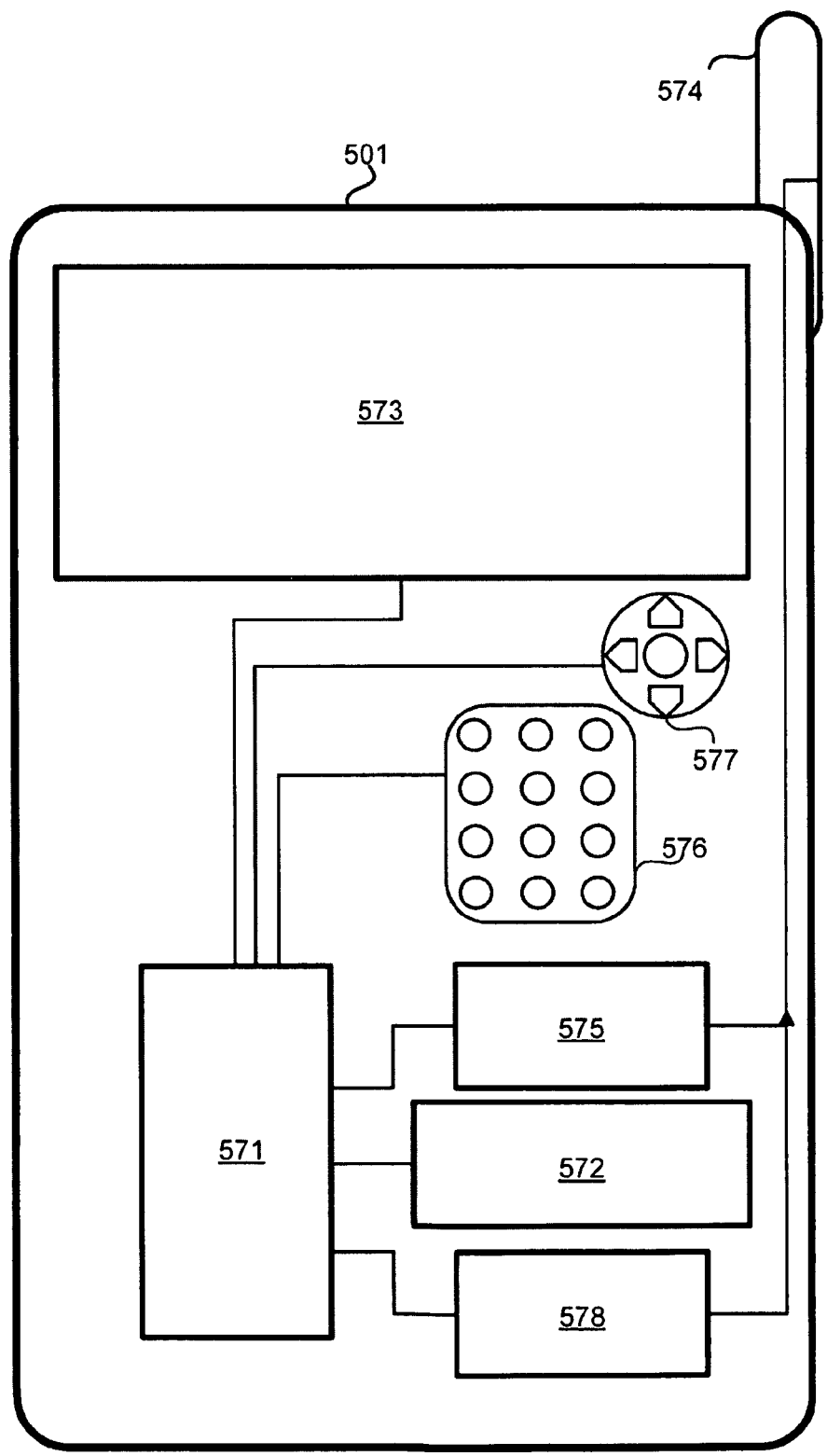
FIG. 16 is circuit block diagram of an example handset device suitable for use with the various embodiments.

The embodiments described above may be implemented on any of a variety of mobile device, such as, for example, cellular telephones, personal data assistants (PDA) with cellular telephone, mobile electronic mail receivers, mobile web access devices, and other processor equipped devices that may be developed in the future that connect to a wireless network. Typically, such mobile devices will have in common the components illustrated in FIG. 16. For example, the mobile device 501 may include a processor 571 coupled to internal memory 572 and a display 573. Additionally, the mobile device 501 will have an antenna 574 for sending and receiving electromagnetic radiation that is connected to a wireless data link and/or cellular telephone transceiver 575 coupled to the processor 571. In some implementations, the transceiver 575 and portions of the processor 571 and memory 572 used for cellular telephone communications is referred to as the air interface since it provides a data interface via a wireless data link.

The processor 571 may be any programmable microprocessor, microcomputer or multiple processor chip or chips that can be configured by software instructions (applications) to perform a variety of functions, including the functions of the various embodiments described above. In some mobile devices, multiple processors 571 may be provided, such as one processor dedicated to wireless communication functions and one processor dedicated to running other applications. Typically, software applications may be stored in the internal memory 572 before they are accessed and loaded into the processor 571. In some mobile devices, the processor 571 may include internal memory sufficient to store the application software instructions. For the purposes of this description, the term memory refers to all memory accessible by the processor 571, including internal memory 572 and memory within the processor 571 itself. User data files, such as a CellID buffer, are typically stored in the memory 572. In many mobile devices, the memory 572 may be a volatile or nonvolatile memory, such as flash memory, or a mixture of both. Mobile devices typically include a key pad 576 or miniature keyboard and menu selection buttons or rocker switches 577 for receiving user inputs. The mobile device 501 may further include a GPS receiver 578 coupled to the processor 571 and to an antenna, such as the communication antenna 574. The GPS receiver 578 may be any of a variety of known or future GPS receiver chips (or chipsets) available for inclusion within mobile devices such as cellular telephones.

Figure 17:
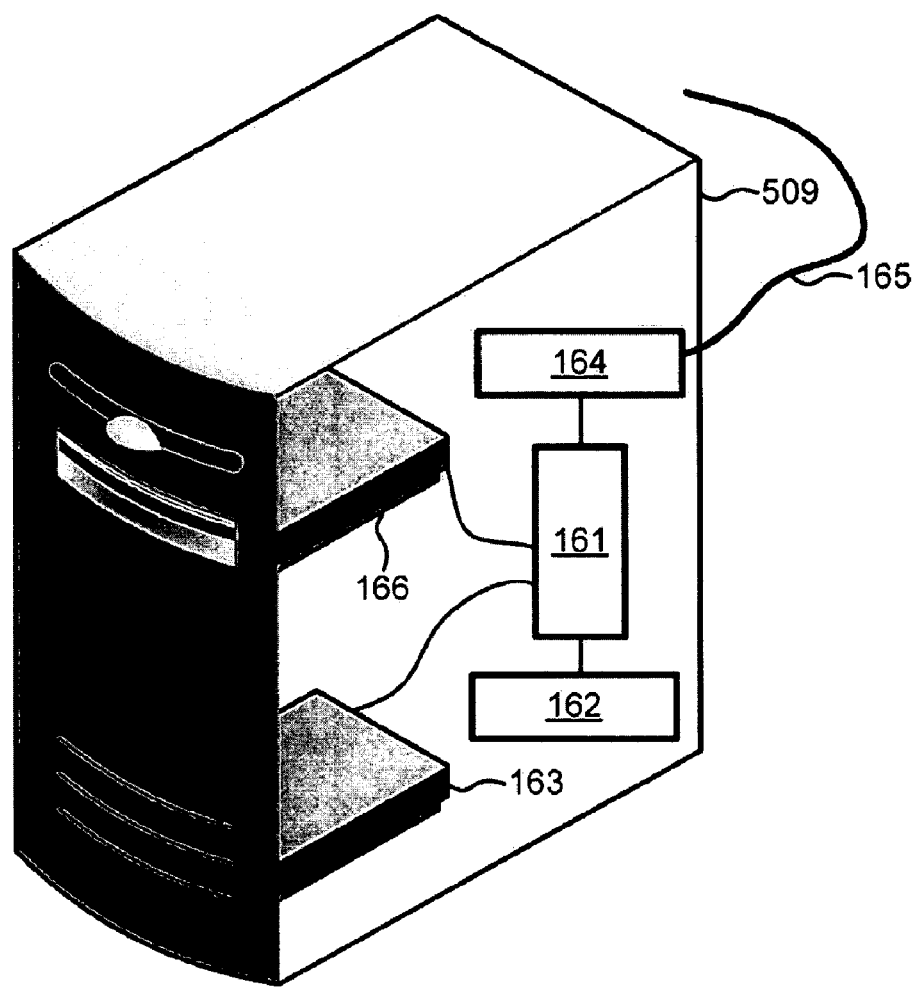
FIG. 17 is a component block diagram of an example server suitable for use with the various embodiments.

The embodiments described above may also be implemented on any of a variety of server systems such as illustrated in FIG. 17. Such a server 509 typically includes a processor 161 coupled to volatile memory 162 and a large capacity nonvolatile memory, such as a disk drive 163. The processor 161 is coupled to one or more network interface circuits, such as high speed modems 164 coupled to a network 165 such as the Internet. The computer 160 may also include a portable media reader, such as a compact disc (CD) drive 166 coupled to the processor 161.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for scheduling a transmission of a message, comprising:
   receiving the message content on a mobile device;
   receiving a telephone number of at least one intended recipient to receive the message;
   receiving on the mobile device a geographic transmission criteria for the message that is a location of the at least one intended recipient received as a reference to a contact database;
   obtaining an address of the at least one intended recipient from the contact database for use as the geographic transmission criteria;
   storing the message content in memory;
   storing the geographic transmission criteria in memory;
   determining a current location of the mobile device;
   comparing the current location of the mobile device to the geographic transmission criteria to determine if the message should be transmitted;
   retrieving the message content from the memory if the current location satisfies the geographic transmission criteria; and
   transmitting the message.

2. A method for scheduling a transmission of a message, comprising:
   receiving the message content on a mobile device;
   receiving a telephone number of at least one intended recipient to receive the message;
   receiving on the mobile device a geographic transmission criteria for the message;
   storing the message content in memory;
   storing the geographic transmission criteria in memory;
   determining a current location of the mobile device;
   comparing the current location of the mobile device to the geographic transmission criteria to determine if the message should be transmitted;
   retrieving calendar data from a calendar application;
   retrieving the message content from the memory if the current location satisfies the geographic transmission criteria; and
   transmitting the message,
   wherein the steps of retrieving the message content from memory and transmitting the message are performed only if the calendar data does not indicate a schedule conflict.

3. The method of claim 1, further comprising alerting a user of the mobile device that the message has been transmitted.

4. The method of claim 1, further comprising requesting confirmation from a user of the mobile device prior to transmitting the message.

5. The method of claim 1, further comprising:
   obtaining a city from an address record for the at least one recipient stored in the contacts database; and
   using the city as the geographic transmission criteria.

6. The method of claim 1, wherein the location of the mobile device is based upon a cell identifier within a cellular network.

7. The method of claim 1, wherein the location of the mobile device is based upon global positioning system (GPS) coordinates measured by a GPS receiver included within the mobile device.

8. The method of claim 1, wherein the step of comparing the current location to the geographic transmission criteria is performed within an operating system of the mobile device.

9. A mobile device, comprising:
   means for receiving a message on the mobile device;
   means for receiving a telephone number of at least one intended recipient to receive the message;
   means for receiving on the mobile device a geographic transmission criteria for the message that is a location of the at least one intended recipient received as a reference to a contact database;
   means for obtaining an address of the at least one intended recipient from the contact database for use as the geographic transmission criteria;
   means for storing the message;
   means for storing the geographic transmission criteria;
   means for determining a current location of the mobile device;
   means for comparing the current location of the mobile device to the geographic transmission criteria to determine if the message should be transmitted;
   means for retrieving the message from the means for storing the message if the current location satisfies the geographic transmission criteria; and
   means for transmitting the message.

10. The mobile device of claim 9, further comprising means for alerting a user of the mobile device that the message has been transmitted.

11. The mobile device of claim 9, further comprising means for requesting confirmation from a user of the mobile device prior to transmitting the message.

12. The mobile device of claim 9, further comprising:
   means for obtaining a city from an address record for the at least one recipient stored in the contacts database; and
   means for using the city as the geographic transmission criteria.

13. The mobile device of claim 9, wherein the location of the mobile device is based upon a cell identifier within a cellular network.

14. The mobile device of claim 9, wherein the location of the mobile device is based upon global positioning system (GPS) coordinates measured by a GPS receiver included within the mobile device.

15. The mobile device of claim 9, wherein the means for comparing the current location to the geographic transmission criteria is within an operating system of the mobile device.

16. A mobile device, comprising:
a user interface display;
a user interface keypad;
an air interface for transmitting and receiving data signals;
a processor coupled to the user interface keypad, the user interface display and the air interface; and
a memory coupled to the processor, said memory having stored therein processor executable software instructions configured to cause the processor to perform steps comprising:
receiving a message on a mobile device;
receiving a telephone number of at least one intended recipient to receive the message;
receiving on the mobile device a geographic transmission criteria for the message that is a location of the at least one intended recipient received as a reference to a contact database;
obtaining an address of the at least one intended recipient from the contact database for use as the geographic transmission criteria;
storing the message in memory;
storing the geographic transmission criteria in memory;
determining a current location of the mobile device;
comparing the current location of the mobile device to the geographic transmission criteria to determine if the message should be transmitted;
retrieving the message from the memory if the current location satisfies the geographic transmission criteria; and
transmitting the message.

17. A mobile device, comprising:
a user interface display;
a user interface keypad;
an air interface for transmitting and receiving data signals;
a processor coupled to the user interface keypad, the user interface display and the air interface; and
a memory coupled to the processor, said memory having stored therein processor executable software instructions configured to cause the processor to perform steps comprising:
receiving a message on a mobile device;
receiving a telephone number of at least one intended recipient to receive the message;
receiving on the mobile device a geographic transmission criteria for the message;
storing the message in memory;
storing the geographic transmission criteria in memory;
determining a current location of the mobile device;
comparing the current location of the mobile device to the geographic transmission criteria to determine if the message should be transmitted;
retrieving calendar data from a calendar application;
retrieving the message from the memory if the current location satisfies the geographic transmission criteria; and
transmitting the message,
wherein the steps of retrieving the message from memory and transmitting the message are performed only if the calendar data does not indicate a schedule conflict.

18. The mobile device of claim 16, wherein the processor executable software instructions stored in the memory are configured to cause the processor to further perform steps comprising alerting a user of the mobile device that the message has been transmitted.

19. The mobile device of claim 16, wherein the processor executable software instructions stored in the memory are configured to cause the processor to further perform steps comprising requesting confirmation from a user of the mobile device prior to the transmitting of the message.

20. The mobile device of claim 16, wherein the processor executable software instructions stored in the memory are configured to cause the processor to further perform steps comprising
obtaining a city from an address record for the at least one recipient stored in the contacts database; and
using the city as the geographic transmission criteria.

21. The mobile device of claim 16, wherein the location of the mobile device is based upon a cell identifier within a cellular network.

22. The mobile device of claim 16, wherein the location of the mobile device is based upon global positioning system (GPS) coordinates measured by a GPS receiver included within the mobile device.

23. The mobile device of claim 16, wherein the processor executable software instructions stored in the memory are configured to cause the processor to perform the step of comparing the current location to the geographic transmission criteria within an operating system operating on the processor.

24. A non-transitory processor-readable storage medium having stored thereon processor-executable software instructions configured to cause a processor to perform steps comprising:
receiving a message on a mobile device;
receiving a telephone number of at least one intended recipient to receive the message;
receiving on the mobile device a geographic transmission criteria for the message;
storing the message in memory;
storing the geographic transmission criteria in memory;
determining a current location of the mobile device;
comparing the current location of the mobile device to the geographic transmission criteria to determine if the message should be transmitted;
retrieving calendar data from a calendar application;
retrieving the message from the memory if the current location satisfies the geographic transmission criteria only if the calendar data does not indicate a schedule conflict; and
transmitting the message only if the calendar data does not indicate a schedule conflict.

25. The non-transitory processor-readable storage medium of claim 24 further having stored thereon processor-executable software instructions configured to cause a processor to perform further steps comprising alerting a user of the mobile device that the message has been transmitted.

26. The non-transitory processor-readable storage medium of claim 24 further having stored thereon processor-executable software instructions configured to cause a processor to perform further steps comprising requesting confirmation from a user of the mobile device prior to the transmitting of the message.

27. The non-transitory processor-readable storage medium of claim 24 further having stored thereon processor-executable software instructions configured to cause a processor to perform the step of comparing the current location to the geographic transmission criteria within an operating system operating on the processor.

* * * * *